(12) United States Patent
Li et al.

(10) Patent No.: US 12,004,036 B2
(45) Date of Patent: Jun. 4, 2024

(54) SCG-SIDE SERVICE PROCESSING METHOD AND APPARATUS IN DUAL CONNECTIVITY SCENARIO

(71) Applicant: Huawei Technologies Co., Ltd., Shenzhen (CN)

(72) Inventors: Xiaoxian Li, Shenzhen (CN); Fenghui Dou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 339 days.

(21) Appl. No.: 17/605,113

(22) PCT Filed: Apr. 24, 2020

(86) PCT No.: PCT/CN2020/086527
§ 371 (c)(1),
(2) Date: Oct. 20, 2021

(87) PCT Pub. No.: WO2020/221110
PCT Pub. Date: Nov. 5, 2020

(65) Prior Publication Data
US 2022/0201581 A1    Jun. 23, 2022

(30) Foreign Application Priority Data

Apr. 30, 2019   (CN) .......................... 201910358482.0
Aug. 29, 2019   (CN) .......................... 201910808801.3

(51) Int. Cl.
*H04W 36/30* (2009.01)
*H04W 36/00* (2009.01)
(Continued)

(52) U.S. Cl.
CPC ....... *H04W 36/30* (2013.01); *H04W 36/0058* (2018.08); *H04W 36/0069* (2018.08); *H04W 36/08* (2013.01); *H04W 76/15* (2018.02)

(58) Field of Classification Search
None
See application file for complete search history.

(56) References Cited

U.S. PATENT DOCUMENTS

2013/0189993 A1   7/2013 Han et al.
2015/0223095 A1   8/2015 Centonza et al.
(Continued)

FOREIGN PATENT DOCUMENTS

CN   103220655 A   7/2013
CN   105960772 A   9/2016
(Continued)

OTHER PUBLICATIONS

R2-1903859, Ericsson, "[E040,S005,H016] Reporting of SCG serving cells measurements in NE-DC," 3GPP TSG-RAN2 Meeting #105bis, Xi'An, China, Apr. 8-12, 2019, 11 pages.
(Continued)

*Primary Examiner* — Anh Vu H Ly
(74) *Attorney, Agent, or Firm* — Conley Rose, P.C.

(57) ABSTRACT

A secondary cell group (SCG) side service processing method includes a master base station that configures a master cell group and an SCG for a terminal device. In uplink and downlink data transmission processes, when link quality information of a serving cell in the SCG meets a first preset condition, the terminal device obtains link quality information of a neighboring cell of the serving cell, determines, based on the link quality information, whether there is a better neighboring cell, and when there is no better neighboring cell, sends a first message to the master base station to enable the master base station to determine, based on the first message, whether to release the SCG.

20 Claims, 11 Drawing Sheets

(51) Int. Cl.
*H04W 36/08* (2009.01)
*H04W 76/15* (2018.01)

(56) References Cited

U.S. PATENT DOCUMENTS

| | | | |
|---|---|---|---|
| 2016/0212753 A1* | 7/2016 | Wu | H04L 5/0032 |
| 2018/0160339 A1* | 6/2018 | Wu | H04W 36/0069 |
| 2018/0278357 A1* | 9/2018 | Kim | H04J 11/0076 |
| 2018/0368029 A1* | 12/2018 | Wu | H04W 36/0069 |
| 2019/0182698 A1* | 6/2019 | Park | H04W 24/10 |
| 2019/0274179 A1 | 9/2019 | Vajapeyam et al. | |
| 2020/0029237 A1* | 1/2020 | Kim | H04W 24/10 |
| 2021/0168673 A1* | 6/2021 | Fan | H04W 76/15 |
| 2021/0243658 A1* | 8/2021 | Chang | H04W 24/08 |
| 2022/0182893 A1* | 6/2022 | da Silva | H04W 36/14 |
| 2022/0210852 A1* | 6/2022 | Uchino | H04W 76/20 |

FOREIGN PATENT DOCUMENTS

| | | |
|---|---|---|
| CN | 106332174 A | 1/2017 |
| CN | 108810953 A | 11/2018 |
| CN | 109548095 A | 3/2019 |
| EP | 2945423 A1 | 11/2015 |
| EP | 3051916 A1 | 8/2016 |
| WO | 2018030841 A1 | 2/2018 |
| WO | 2018203710 A1 | 11/2018 |

OTHER PUBLICATIONS

R2-1905418, Ericsson, "[E040,S005,H016] Reporting of SCG serving cells measurements in NE-DC," 3GPP TSG-RAN2 Meeting #105bis, Xi'An, China, Apr. 8-12, 2019, 11 pages.
3GPP TS 36.133 V16.1.0, Mar. 2019, "3rd Generation Partnership Project; Technical Specification Group Radio Access Network; Evolved Universal Terrestrial Radio Access (E-UTRA); Requirements for support of radio resource management (Release 16)," 3583 pages.
3GPP TS 36.304 V15.3.0, Mar. 2019, "3rd Generation Partnership Project; Technical Specification Group Radio Access Network; Evolved Universal Terrestrial Radio Access (E-UTRA); User Equipment (UE) procedures in idle mode (Release 15)," 55 pages.
3GPP TS 36.214 V15.3.0, Sep. 2018, "3rd Generation Partnership Project; Technical Specification Group Radio Access Network; Evolved Universal Terrestrial Radio Access (E-UTRA); Physical layer; Measurements (Release 15)," 25 pages.
3GPP TS 37.340 V15.5.0, Mar. 2019, "3rd Generation Partnership Project; Technical Specification Group Radio Access Network; Evolved Universal Terrestrial Radio Access (E-UTRA) and NR; Multi-connectivity; Stage 2 (Release 15)," 68 pages.
3GPP TS 38.133 V15.5.0, Mar. 2019, "3rd Generation Partnership Project; Technical Specification Group Radio Access Network; NR; Requirements for support of radio resource management (Release 15)," 893 pages.
3GPP TS 38.215 V15.4.0, Dec. 2018, "3rd Generation Partnership Project; Technical Specification Group Radio Access Network; NR; Physical layer measurements (Release 15)," 15 pages.
3GPP TS 38.304 V15.3.0, Mar. 2019, "3rd Generation Partnership Project; Technical Specification Group Radio Access Network; NR; User Equipment (UE) procedures in Idle mode and RRC Inactive state (Release 15)," 29 pages.
3GPP TS 38.321 V15.5.0, Mar. 2019, "3rd Generation Partnership Project; Technical Specification Group Radio Access Network; NR; Medium Access Control (MAC) protocol specification (Release 15)," 78 pages.
3GPP TS 38.331 V15.5.1, Apr. 2019, "3rd Generation Partnership Project; Technical Specification Group Radio Access Network; NR; Radio Resource Control (RRC) protocol specification (Release 15)," 491 pages.
R2-1904555, Huawei et al., "[E040][S005][H016] Reporting of SCG measurements in NE-DC," 3GPP TSG-RAN WG2 Meeting#105bis, Xi'an, China, Apr. 8-12, 2019, 4 pages.
R1-1903650, Intel Corporation, "Summary on SCell BFR and L1-SINR," 3GPP TSG RAN WG1 Meeting #96, Athens, Greece, Feb. 25-Mar. 1, 2019, 21 pages.
3GPP TS 36.331 V15.5.1, Apr. 2019 "3rd Generation Partnership Project; Technical Specification Group Radio Access Network; Evolved Universal Terrestrial Radio Access (E-UTRA); Radio Resource Control (RRC); Protocol specification (Release 15)," 948 pages.

* cited by examiner

SCG-SIDE SERVICE PROCESSING METHOD AND APPARATUS IN DUAL CONNECTIVITY SCENARIO

CROSS-REFERENCE TO RELATED APPLICATIONS

This is a U.S. National Stage of International Patent Application No. PCT/CN2020/086527 filed on Apr. 24, 2020, which claims priority to Chinese Patent Application No. 201910808801.3 filed on Aug. 29, 2019 and Chinese Patent Application No. 201910358482.0 filed on Apr. 30, 2019. All of the aforementioned patent applications are hereby incorporated by reference in their entireties.

TECHNICAL FIELD

Embodiments of this application relate to the field of communications technologies, and in particular, to an SCG-side service processing method and apparatus in a dual connectivity scenario.

BACKGROUND

The 3rd Generation Partnership Project (3rd Generation Partnership Project, 3|GPP) launches a fifth generation (5th-Generation, 5G) communications system. In the 5G communications system, a new radio (new radio, NR) access technology is introduced to implement high-throughput and low-latency transmission. Three main application scenarios of the 5G communications system are enhanced mobile broadband (enhanced mobile broadband, eMBB), massive machine type communication (machine-type communication, MTC), and ultra-reliable and low latency communications (ultra-reliable low latency communications, URLLC). To enhance network mobility and improve a user throughput, a new enhancement solution called dual connectivity (dual connectivity, DC) is introduced. In this solution, a terminal device may be connected to two base stations at the same time. One base station is referred to as a master base station, and the other station is referred to as a secondary base station.

In a dual connectivity architecture, the master base station configures a master cell group (master cell group, MCG) and a secondary cell group (secondary cell group, SCG) for the terminal device. From a perspective of the terminal device side, there are three types of bearers: an MCG bearer, an SCG bearer, and a split (split) bearer. In a downlink data transmission process, when the split bearer is used, a gateway sends one channel of data. The data arrives at a split point, and the split point divides the data into two channels of data. One channel of data directly flows to the terminal device, and the other channel of data flows to the terminal device by using the other base station. The split point may be the master base station or the secondary base station. In an uplink data transmission process, when the split bearer is used, if the terminal device meets a condition, for example, an uplink buffer amount reaches a threshold, the terminal device separately sends data to the master base station and the secondary base station. The two channels of data are merged at one of the base stations and then sent to a gateway.

In the uplink and downlink data transmission processes, quality of service on the SCG side may be poor. For example, coverage of the secondary base station may be discontinuous. For another example, the master base station is an eNB in long term evolution (long term evolution, LTE), and the secondary base station is a gNB in new radio (new radio, NR). When the gNB uses a C-band or a higher frequency band, coverage of the gNB is relatively small. Alternatively, a mobility parameter configured for the gNB is improper. Consequently, transmission quality in a cell on the SCG side is continuously poor, and power consumption is high and service experience decreases.

SUMMARY

Embodiments of this application provide an SCG-side service processing method and apparatus in a dual connectivity scenario. When quality of service on an SCG side is poor, a terminal device reports, to a master base station, link quality information that is of a serving cell or a best neighboring cell and that is determined by the terminal device. Therefore, the master base station determines, based on the link quality information reported by the terminal, whether to release the SCG or hand over the terminal device from the serving cell to the best neighboring cell, thereby reducing power consumption of the terminal device and improving service experience.

According to a first aspect, an embodiment of this application provides an SCG-side service processing method in a dual connectivity scenario. The method is applied to a terminal device, and the terminal device establishes dual connections to a master base station and a secondary base station. The method includes: The master base station configures a master cell group and a secondary cell group for the terminal device. In uplink and downlink data transmission processes, when determining that link quality information of a serving cell in the SCG meets a first preset condition, the terminal device obtains link quality information of at least one neighboring cell of the serving cell; determines, based on the link quality information, whether there is a better neighboring cell; and if there is no better neighboring cell, sends a first message to the master base station. The master base station determines, based on the first message, whether to release the SCG cell group. If the solution is used, when the link quality information of the serving cell in the SCG meets the first preset condition, in other words, when quality of service on the SCG side is poor, because the terminal device can promptly send, to the master base station, link quality information determined based on the link quality information of the serving cell, the master base station promptly determines whether to release the SCG and the like. This prevents the terminal device from continuing to transmit uplink and downlink data based on the serving cell.

In a feasible design, the link quality information of the serving cell includes one or more pieces of the following information: a quantity of starting times of a timer T313 corresponding to a cell in the SCG, running duration of a timer T313 corresponding to a cell in the SCG, a quantity of out-of-synchronization out of sync events in a cell in the SCG, a throughput of data transmitted in a cell in the SCG, a ratio of a throughput of data transmitted in a cell in the SCG to a power consumption amount, a quantity of beam failures triggered in a cell in the SCG, an amount of data buffered at a radio link control RLC layer corresponding to a cell in the SCG, latency of uplink data sent on a link in a cell in the SCG, a signal strength of a cell in the SCG, signal strength change amplitude of a cell in the SCG, a retransmission rate of data transmitted on a link in a cell in the SCG, a signal to interference plus noise ratio SINR of a cell in the SCG, a modulation and coding scheme MCS index corresponding to a cell in the SCG, or a block error rate BLER in sending downlink data and/or receiving uplink data in a cell in the SCG. If the solution is used, the terminal device can flexibly determine the quality of service on the SCG side.

In a feasible design, the terminal device may determine, in one or a combination of the following manners, whether the link quality information of the serving cell in the SCG meets the first preset condition, in other words, whether the quality of service on the SCG side is poor:

determining that the quantity of starting times of the timer T313 corresponding to the cell in the SCG exceeds a first threshold;

determining that the running duration of the timer T313 corresponding to the cell in the SCG exceeds a second threshold;

determining that the quantity of out-of-synchronization out of sync events in the cell in the SCG exceeds a third threshold;

determining that the throughput of the data transmitted in the cell in the SCG is less than a fourth threshold;

determining that the ratio of the throughput of the data transmitted in the cell in the SCG to the power consumption amount is less than a fifth threshold;

determining that the quantity of beam failures triggered in the cell in the SCG exceeds a sixth threshold;

determining that the amount of data buffered at the radio link control RLC layer corresponding to the cell in the SCG exceeds a seventh threshold;

determining that the latency of the uplink data sent on the link in the cell in the SCG exceeds an eighth threshold;

determining that the signal strength of the cell in the SCG is less than a ninth threshold; determining that the signal strength change amplitude of the cell in the SCG exceeds a tenth threshold;

determining that the retransmission rate of the data transmitted on the link in the cell in the SCG exceeds an eleventh threshold;

determining that the signal to interference plus noise ratio SINR of the cell in the SCG is less than a twelfth threshold;

determining that the modulation and coding scheme MCS index corresponding to the cell in the SCG is less than a thirteenth threshold, where the MCS index is an MCS index for sending downlink data in the cell in the SCG and/or an MCS index for receiving uplink data in the cell in the SCG; and determining that the block error rate BLER in sending the downlink data and/or receiving the uplink data in the cell in the SCG is less than a fourteenth threshold.

If the solution is used, the terminal device can flexibly determine whether the quality of service on the SCG side meets the first preset condition.

In a feasible design, the link quality information of the neighboring cell includes at least one of reference signal received power RSRP, reference signal received quality RSRQ, a signal to interference plus noise ratio SINR, load, a priority, or availability. If the solution is used, the terminal device can flexibly determine whether there is a better neighboring cell in the neighboring cell.

In a feasible design, if there is a better neighboring cell in the at least one neighboring cell, the terminal device generates a second message. The second message carries link quality information determined by the terminal device based on the link quality information of the better neighboring cell. The terminal device sends the second message to the master base station. If the solution is used, when there is a better neighboring cell, the terminal device can promptly send the determined link quality information of the better neighboring cell to the master base station, so that the master base station promptly determines whether to trigger the terminal device to perform cell handover. This prevents the terminal device from continuing to transmit uplink and downlink data based on the serving cell.

In a feasible design, the second message is an A3 measurement report, an A4 measurement report, or an A5 measurement report. If the solution is used, the terminal device can flexibly send the second message.

In a feasible design, after sending the second message to the master base station, the terminal device further receives a handover message sent by the master base station. The handover message is used to indicate the terminal device to be handed over from the serving cell to the better neighboring cell. If the solution is used, the master base station promptly determines whether to release the SCG and the like. This prevents the terminal device from continuing to transmit uplink and downlink data based on the serving cell.

In a feasible design, the first message is an A2 measurement report. If the solution is used, the terminal device can flexibly send the first message.

In a feasible design, after sending the first message to the master base station, the terminal device further receives a release message sent by the master base station. The release message is used to indicate the terminal device to release the SCG. The terminal device releases the SCG based on the release message. If the solution is used, the terminal device sends the second message to the master base station, so that the master base station promptly determines whether to send the handover message to the terminal device to enable the terminal device to be handed over to the better neighboring cell. This ensures a success rate in uplink and downlink data transmission, and avoids high power consumption of the terminal device while improving uplink and downlink quality of service.

According to a second aspect, an embodiment of this application provides an SCG-side service processing apparatus, applied to a terminal device in a dual connectivity scenario, where the terminal device establishes dual connections to a master base station and a secondary base station, and the apparatus includes:

a processing unit, configured to: obtain link quality information of a serving cell in a secondary cell group SCG; if the link quality information of the serving cell meets a first preset condition, obtain link quality information of at least one neighboring cell of the serving cell; and if there is no better neighboring cell in the at least one neighboring cell, generate a first message, where the better neighboring cell is a neighboring cell whose link quality information meets a second preset condition in the at least one neighboring cell, and the first message carries link quality information determined by the terminal device based on the link quality information of the serving cell; and a transceiver unit, configured to send the first message to the master base station, so that the master base station processes a service on the SCG side based on the first message.

In a feasible design, the link quality information of the serving cell includes one or more pieces of the following information: a quantity of starting times of a timer T313 corresponding to a cell in the SCG, running duration of a timer T313 corresponding to a cell in the SCG, a quantity of out-of-synchronization out of sync events in a cell in the SCG, a throughput of data transmitted in a cell in the SCG, a ratio of a throughput of data transmitted in a cell in the SCG to a power consumption amount, a quantity of beam failures triggered in a cell in the SCG, an amount of data buffered at a radio link control RLC layer corresponding to a cell in the SCG, a latency of uplink data sent on a link in a cell in the SCG, a signal strength of a cell in the SCG, a signal strength change amplitude of a cell in the SCG, a retransmission rate of data transmitted on a link in a cell in the SCG, a signal to interference plus noise ratio SINR of a cell in the SCG, a modulation and coding scheme MCS index corresponding to a cell in the SCG, or a block error rate BLER in sending downlink data and/or receiving uplink data in a cell in the SCG.

In a feasible design, the link quality information of the neighboring cell includes at least one of reference signal received power RSRP, reference signal received quality RSRQ, a signal to interference plus noise ratio SINR, load, a priority, or availability.

In a feasible design, the processing unit is further configured to: if there is a better neighboring cell in the at least one neighboring cell, generate a second message. The second message carries link quality information determined by the terminal device based on the link quality information of the better neighboring cell.

The transceiver unit is further configured to send the second message to the master base station.

In a feasible design, the second message is an A3 measurement report, an A4 measurement report, or an A5 measurement report.

In a feasible design, after sending the second message to the master base station, the transceiver unit is further configured to receive a handover message sent by the master base station. The handover message is used to indicate the terminal device to be handed over from the serving cell to the better neighboring cell.

In a feasible design, the first message is an A2 measurement report.

In a feasible design, after sending the first message to the master base station, the transceiver unit is further configured to receive a release message sent by the master base station. The release message is used to indicate the terminal device to release the SCG.

The processing unit is further configured to release the SCG based on the release message.

According to a third aspect, an embodiment of this application provides a computer program product including instructions. When the computer program product is run on a terminal device, the terminal device is enabled to perform the method in any one of the first aspect or the possible implementations of the first aspect.

According to a fourth aspect, an embodiment of this application provides a computer-readable storage medium. The computer-readable storage medium stores instructions. When the instructions are run on a terminal device, the terminal device is enabled to perform the method in any one of the first aspect or the possible implementations of the first aspect.

According to a fifth aspect, a terminal device is provided. The terminal device includes a processor and a memory, and the processor is coupled to the memory to perform the method in any one of the first aspect or the possible implementations of the first aspect.

The SCG-side service processing method and apparatus provided in the embodiments of this application are applied to the terminal device in the dual connectivity scenario. The master base station configures the master cell group and the secondary cell group for the terminal device. In the uplink and downlink data transmission processes, when determining that the link quality information of the serving cell in the SCG meets the first preset condition, the terminal device obtains the link quality information of the at least one neighboring cell of the serving cell; determines, based on the link quality information, whether there is a better neighboring cell; and if there is no better neighboring cell, sends the first message to the master base station. The master base station determines, based on the first message, whether to release the SCG cell group. In this process, when the link quality information of the serving cell in the SCG meets the first preset condition, in other words, when the quality of service on the SCG side is poor, because the terminal device can promptly send, to the master base station, the link quality information determined based on the link quality information of the serving cell, the master base station promptly determines whether to release the SCG and the like. This prevents the terminal device from continuing to transmit uplink and downlink data based on the serving cell.

DESCRIPTION OF EMBODIMENTS

To enhance network mobility and improve a user throughput, a dual connectivity (dual connectivity, DC) architecture is further introduced in a 5G communications system. In the architecture, a terminal device is connected to two base stations at the same time. One base station is referred to as a master base station or a master network node (master node, MN), and the other base station is referred to as a secondary base station or a secondary network node (secondary node). In the dual connectivity architecture, an MCG and an SCG are configured for a terminal device in a connected mode. Based on different arrangements and combinations of air interfaces and core networks and a radio access technology applied to a control plane (control plane, CP) during dual connectivity, the dual connectivity architecture in the 5G system is divided into an EN-DC architecture, an NGEN-DC architecture, an NE-DC architecture, an NR-DC architecture, and the like. DC represents dual connectivity, namely, dual connections. E represents evolved universal terrestrial radio access (Evolved Universal Terrestrial Radio Access, E-UTRA), namely, a 4G radio access network. N represents NR, namely, 5G new radio. NGE represents next-generation E-UTRA (Next Generation E-UTRA, NGE), that is, in the NGEN-DC architecture, the MN is a next-generation eNB, and may be connected to a 5G core network. A 5G network deployment architecture is divided into a standalone (Standalone, SA) networking architecture and a non-standalone (Non-Standalone, NSA) networking architecture based on whether to independently deploy an NR base station and an NR core network. In a process in which 4G is smoothly evolved to 5G, most operators choose the NSA architecture for networking in an initial phase of 5G network construction to protect existing 4G investment. EN-DC is a main form of the NSA networking architecture.

In the EN-DC architecture, the master base station is an eNB, the secondary base station is a gNB, and the two base stations are respectively denoted as a master eNB (master eNB, MeNB) and a secondary eNB (secondary SgNB). Based on different split points, EN-DC may be further divided into three architectures: option (option) 3, option3a, and option3x. In the option3 architecture, a split point is the MeNB. In the option3x architecture, a split point is the SgNB. In the option3a architecture, a core network performs split. As deployment of the NR base station, namely, the gNB, is gradually improved, the dual connectivity architecture may be subsequently changed to NE-DC and NGEN-DC such as option4, option4a, option7, option7a, and option7x, or even to an SA architecture such as option2.

Figure 1:
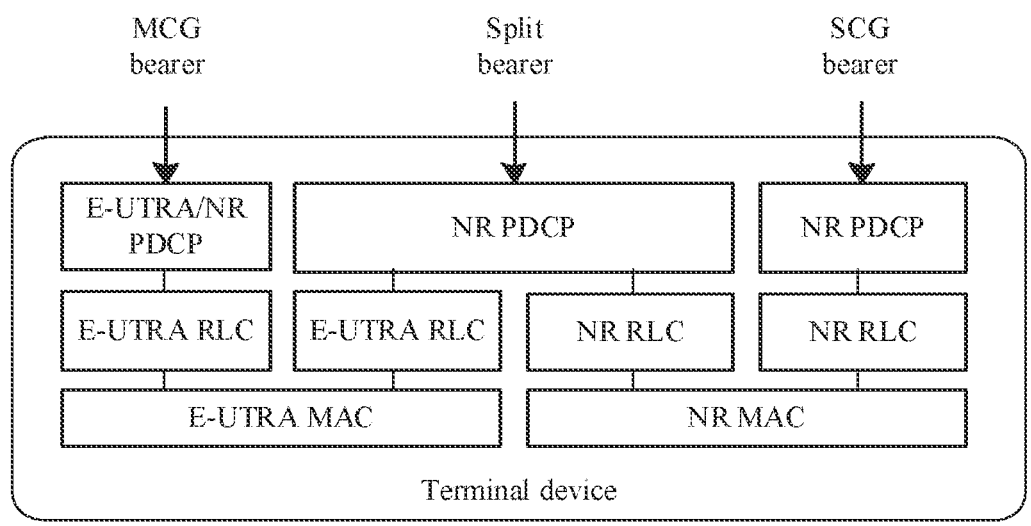
FIG. 1 is a schematic structural diagram of a radio protocol stack of a bearer established on a terminal device side in an EN-DC architecture.

FIG. 1 is a schematic structural diagram of a radio protocol stack of a bearer established on a terminal device side in an EN-DC architecture. Referring to FIG. 1, in the EN-DC architecture, a core network is an evolved packet core (evolved packet core, EPC). From a perspective of the terminal device, there are three types of bearers: an MCG bearer, an SCG bearer, and a split (split) bearer. When an option3 architecture is used, an MeNB is used as a split point. After data sent by a gateway arrives at the MeNB, the MeNB encapsulates the data into a packet data convergence protocol (packet data convergence protocol, PDCP) packet, and the MeNB forwards the PDCP packet to a radio link control (radio link control, RLC) layer of an SgNB through an Xx interface between the MeNB and the SgNB. When an option3a architecture is used, an SgNB is used as a split point. After data sent by a gateway arrives at the SgNB, the SgNB encapsulates the data into a PDCP packet, and forwards the PDCP packet to an RLC layer of an MeNB through an Xx interface. For details, refer to 3rd Generation Partnership Project (3rd Generation Partnership Project, 3GPP) technical specifications (technical specifications, TS) 37.340.

Figure 2:
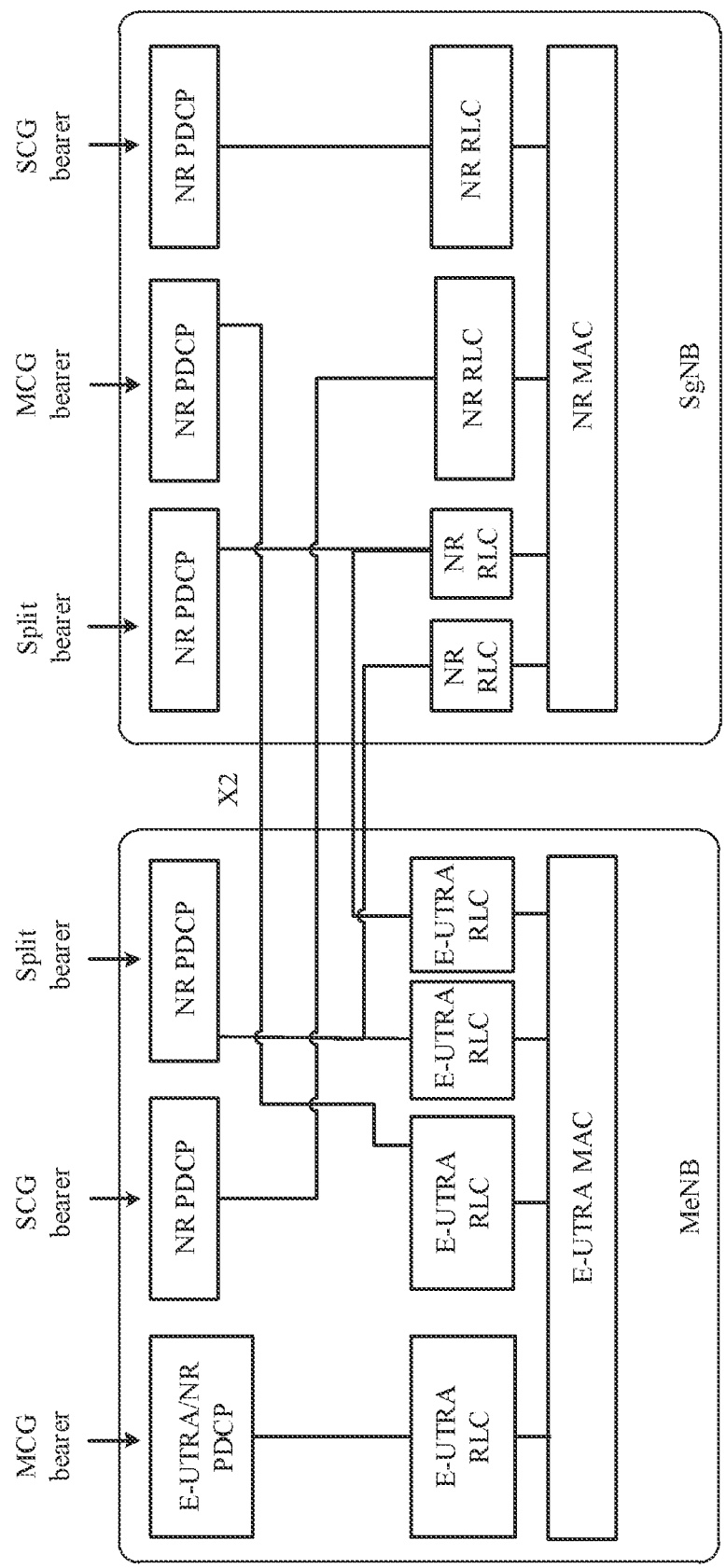
FIG. 2 is a schematic structural diagram of a radio protocol stack on a network device side in an EN-DC architecture.

FIG. 2 is a schematic structural diagram of a radio protocol stack on a network device side in an EN-DC architecture. Referring to FIG. 2, there are three types of bearers: an MCG bearer, an SCG bearer, and a split (split) bearer. From a perspective of an MeNB or an SgNB, the split bearer includes two types: a split bearer used when a split point is the MeNB and a split bearer used when a split point is the SgNB, and the two cases respectively correspond to an option3 architecture and an option3x architecture. It should be noted that, in this embodiment of this application, the split bearer is a split bearer.

Figure 3:
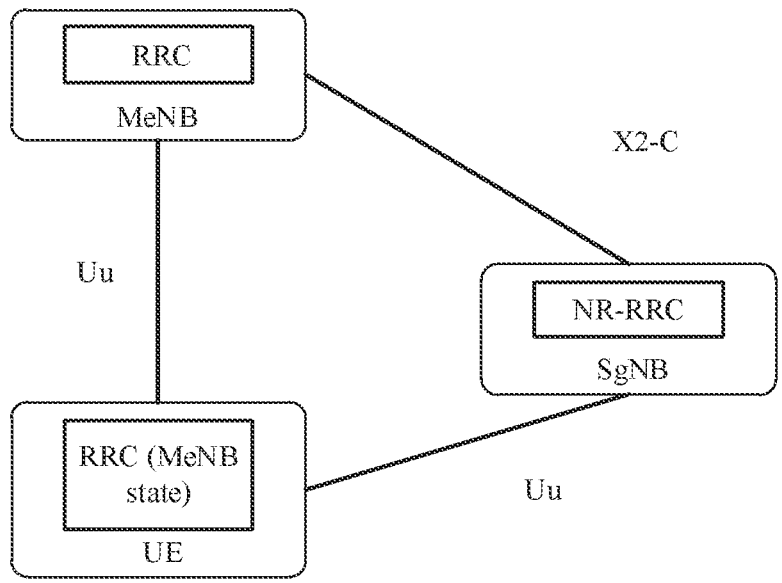
FIG. 3 is a schematic architectural diagram of a control plane in EN-DC.

FIG. 3 is a schematic architectural diagram of a control plane in EN-DC. Referring to FIG. 3, an MeNB and an SgNB have their respective radio resource control (radio resource control, RRC) entities. A Uu interface is established between a terminal device and the MeNB. A Uu interface is established between the terminal device and the SeNB. An X2-C interface is established between the MeNB and the SgNB. An S1 interface is established between the MeNB and a core network. Based on this architecture, an RRC protocol data unit (protocol data unit, PDU) generated by the SgNB may be forwarded to the terminal device by using the MeNB. The MeNB sends initial RRC configuration of the SgNB by using a signaling radio bearer (signaling radio bearers, SRB) 1, and subsequent reconfiguration may be sent by the MeNB or the SgNB.

In the EN-DC architecture, after a network side configures a split bearer for the terminal device, when an uplink service data amount is greater than an uplink data split threshold (ul-data split threshold), the terminal device may perform uplink service split. A downlink data split policy is determined by a split policy configured by an operator. After split, if quality of service on an NR side, namely, an SCG side, is continuously poor, for example, when at least one of the following conditions is met on the SCG side, the terminal device triggers an SCG failure (failure) reporting process:
  (1) the terminal device detects an SCG radio link failure (radio link failure, RLF);
  (2) synchronization with the SCG fails during reconfiguration
  (3) SCG configuration fails;
  (4) a lower layer of the SCG reports an integrity check failure; or
  (5) the SCG exceeds a maximum uplink transmission timing difference.

If the SCG failure process is triggered, references can be made to 3GPP TS 37.340, and the terminal device needs to perform the following actions:

(1) suspending SCG transmission for a signaling resource bearer signal resource bearer, SRB) and suspending SCG transmission for a data resource bearer (data resource bearer, DRB);

(2) resetting (reset) secondary cell group-media access control (secondary cell group-media access control, SCG-MAC);

(3) if a timer T304 runs, stopping the timer T304; and (4) if the terminal device is in an EN-DC mode, triggering sending of SCG failure information (SCG failure information).

It may be learned from the foregoing descriptions that, when the network side configures the split bearer for the terminal device, if the uplink service data amount is relatively high, the terminal device performs uplink service split. Similarly, if a downlink service data amount is relatively high, a split point performs downlink service split. However, when a frequency band corresponding to the secondary base station is higher than a frequency band corresponding to the master base station, coverage of the secondary base station is smaller. For example, in the EN-DC architecture, if an NR frequency band is higher than an LTE frequency band, coverage of the SgNB is smaller. In addition, in an initial phase of network construction of an NR base station, coverage of the NR base station may be discontinuous and the like. Consequently, the following problem is caused: Power consumption is high and service experience decreases because poor quality of service more likely occurs on the NR side than on an LTE side.

To avoid the problem that power consumption is high and service experience decreases due to poor quality of service on the NR side, when quality on the NR side is poor, the terminal device needs to report related information to the MeNB, to trigger the MeNB to take specific measures. For example, the MeNB delivers a handover instruction to the terminal device, so that the terminal device is handed over to a better-quality cell of the SgNB, or the MeNB releases the SCG and sends an indication to the terminal device. The terminal device usually triggers the MeNB in the following two manners:

Manner 1: The terminal device detects whether a timer T313 expires. If the timer T313 expires, the terminal device reports SCG RLF to the MeNB, and the MeNB determines, based on the SCG RLF, whether to deliver the handover instruction or release the SCG. The timer T313 is used to indicate a timer length of a radio link failure. In a process in which the terminal device detects that the tinier T313 expires, a lower layer of the terminal device reports N313 consecutive out-of-synchronization (out-of-sync) events to RRC to trigger the timer T313 to be started. If the terminal device detects N314 consecutive in-synchronization (in-sync) events before the timer T313 expires, the terminal device stops timing of the timer T313. The SCG RLF is triggered only when the timer T313 expires. However, due to fluctuation of signal transmission, the timer T313 is likely to be started and reset repeatedly, and consequently the SCG RLF cannot be triggered promptly. As a result, quality of service on the NR side may be poor within a long time period before the terminal device officially triggers the SCG RLF, for example, a packet loss rate and a bit error rate are high. Under a power control mechanism, the terminal device gradually increases power, causing an increase of power consumption, and quick power outage, heating, and the like of the terminal device. N313 is used to indicate a maximum quantity of out-of-synchronization events, and N314 is used to indicate a maximum quantity of in-synchronization events. For descriptions of T313, N313, and N314, refer to 3GPP TS 36.331 and 3GPP TS 38.331.

Manner 2: The terminal device sends a measurement report to trigger the MeNB to deliver the handover instruction or release the SCG.

Mobility management of the terminal device is mainly triggered by the network side based on the measurement report of the terminal device, and the measurement report is also reported by the terminal device based on a measurement report reporting triggering threshold configured on the network side. In some networking coverage cases, the measurement report reporting threshold configured on the network side may not meet a service transmission requirement of the terminal device. For example, in case of an EN-DC connection, if reference signal received power (reference signal received power, RSRP) in S-measure (S-measure) configured on the NR side is relatively low, it is relatively difficult for the terminal device trigger a measurement process on the NR side, and information such as a signal strength of a neighboring cell cannot be obtained promptly. The S-measure is a field in measurement configuration (measConfig) in LTE or NR, and the measConfig information element is an information element in RRC reconfiguration (RRC Reconfiguration) signaling sent by the network side. For another example, if a relatively high hysteresis value or an excessively long time to trigger (Time To Trigger) is configured on the NR side for an event A3, the terminal device can trigger the measurement report only when the terminal device determines, through measurement, a neighboring cell whose signal strength is continuously high. However, because quality of service of the terminal device has decreased in a current cell due to interference, discontinuous coverage, and another factor, if the terminal device still cannot trigger the event A3 measurement report, continuous poor quality experience and high power consumption are caused. The event A3 is one of a series of measurement events preconfigured on the network side. The series of measurement events include an event A1 to an event A6. The event A1 means that reporting is performed when a triggering quantity in a serving cell is higher than a threshold. The event A2 means that reporting is performed when the triggering quantity in the serving cell is lower than the threshold. The event A3 means that reporting is performed when a triggering quantity in a neighboring cell is better than a triggering quantity in a primary cell (primary Cell, PCell) or a primary secondary cell (primary secondary cell, PSCell) after an offset is considered. The event A4 means that reporting is performed when the triggering quantity in the neighboring cell is higher than the threshold. The event A5 means that reporting is performed when the triggering quantity in the PCell or the PSCell is lower than a threshold 1 and the triggering quantity in the neighboring cell is higher than a threshold 2. The event A6 means that reporting is performed when the triggering quantity in the neighboring cell is higher than that in the PSCell after an offset is considered. For descriptions of the event A3 and the like, refer to 3GPP TS 36.331 and 3GPP TS 38.331.

It may be learned from the foregoing descriptions that, in a dual connectivity scenario, for example, in the EN-DC architecture, continuous poor quality of service more likely occurs on the NR side than the LTE side for various reasons. For example, the coverage is small when the NR frequency band is higher than the LTE frequency band. For another example, the coverage of the NR base station is discontinuous in the initial phase of network construction. For another example, parameter configuration of the NR base station is improper. In this case, the terminal device needs to promptly notify the network side of the case, so that the network side triggers cell handover or SCG release. If the terminal device reports the SCG RLF by detecting whether the timer T313 expires, because the timer T313 is reset repeatedly, the terminal device cannot trigger the SCG RLF, causing a problem of high uplink and downlink service latencies, high power consumption of the terminal device, and the like. If the terminal device performs measurement, because a measurement parameter and the like that are included in measurement configuration information on the network side may be improperly configured, the terminal device cannot trigger measurement report reporting when quality of service on the NR side is poor. Consequently, the terminal device cannot be handed over to a better neighboring cell.

In view of this, the embodiments of the present invention provide an SCG-side service processing method and apparatus in a dual connectivity scenario. In the dual connectivity scenario, when link quality information of a serving cell in an SCG meets a first preset condition, in other words, when quality of service on the SCG side is continuously poor, a terminal device determines, based on the link quality information of the serving cell on the SCG side, whether there is a neighboring cell whose link quality information meets a second preset condition. If there is a neighboring cell whose link quality information meets the second preset condition, the terminal device sends, to a master base station, a measurement report that carries link quality information that is of a better neighboring cell and that is determined by the terminal device, to trigger the master base station to determine, based on the measurement report, whether to deliver a handover instruction to the terminal device to enable the terminal device to be handed over to the better neighboring cell. If there is no neighboring cell whose link quality information meets the second preset condition, the terminal device sends, to a master base station, a measurement report that carries the link quality information that is of the serving cell and that is determined by the terminal device, to trigger the master base station to determine, based on the measurement report, whether to release the SCG.

Figure 4:
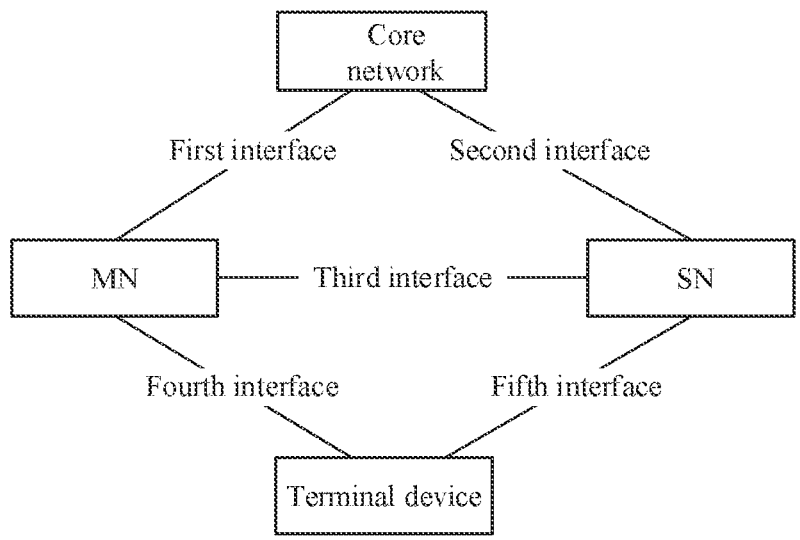
FIG. 4 is a schematic diagram of a dual connectivity architecture used in an SCG-side service processing method in a dual connectivity scenario according to an embodiment of the present invention.

FIG. 4 is a schematic diagram of a dual connectivity architecture used in an SCG-side service processing method in a dual connectivity scenario according to an embodiment of the present invention. Referring to FIG. 4, a terminal device is connected to two network devices at the same time. One network device is referred to as an MN, and the other network device is referred to as an SN. The network device may be one or a combination of several of an eNB, a gNB, a transmission and reception point (transmission and reception point, TRP), a cell (cell), a central unit (central unit, CU), a distributed unit (distributed unit DU), and the like. For example, the network device may be the gNB, and the gNB completes a function of the network device. Alternatively, the network device is a combination of the gNB and the TRP, the gNB completes a resource configuration function, and the TRP completes a sending function and a receiving function. Alternatively, the network device is a combination of the CU and the DU. The terminal device may be a mobile phone, a tablet computer, an intelligent vehicle, a sensor device, the internet of things (internet of things, IOT), customer-premises equipment (customer-premises equipment, CPE), or a relay base station.

Referring to FIG. 4, the MN interacts with a core network through a first interface, and the SN interacts with the core network through a second interface. A third interface between the MN and the SN may be an X2 interface. The MN interacts with the UE through a fourth interface. The fourth interface may be a Uu interface. The SN interacts with the UE through a fifth interface. The fifth interface may be a Uu interface. The architecture shown in FIG. 4 may be an EN-DC architecture, an NGEN-DC architecture, an NE-DC architecture, an NR-DC architecture, or the like.

Figure 5:
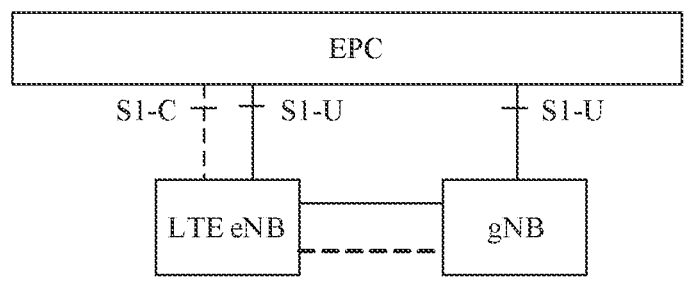
FIG. 5 is a schematic diagram of a first interface and a third interface in an EN-DC architecture in an SCG-side service processing method in a dual connectivity scenario according to an embodiment of the present invention.
Figure 6:
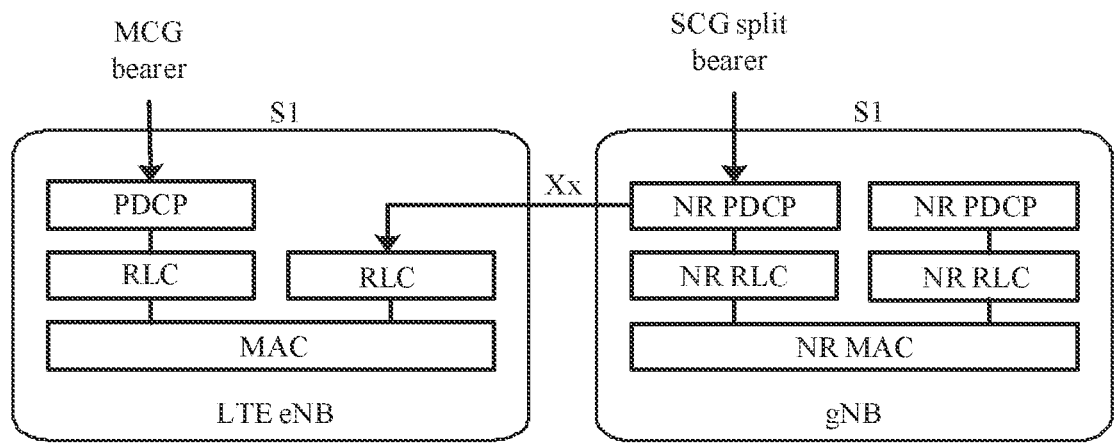
FIG. 6 is a schematic diagram of a split beater in an EN-DC architecture in an SCG-side service processing method in a dual connectivity scenario according to an embodiment of the present invention.

FIG. 5 is a schematic diagram of an EN-DC architecture in an SCG-side service processing method in a dual connectivity scenario according to an embodiment of the present invention. FIG. 6 is a schematic diagram of a split beater in an EN-DC architecture in an SCG-side service processing method in a dual connectivity scenario according to an embodiment of the present invention. Referring to FIG. 5 and FIG. 6, when the EN-DC architecture is used, an MN is an LTE eNB, an SN is a gNB, a core network is EPC, a first interface may include a control plane interface S1-C and a data plane interface S1-U, a second interface may be a data plane interface S1-U, and a third interface between the MN and the SN may be an X2 interface. In the figure, a solid line is a control plane interface, a dashed line is a data plane interface, and the gNB is a split point.

Figure 7:
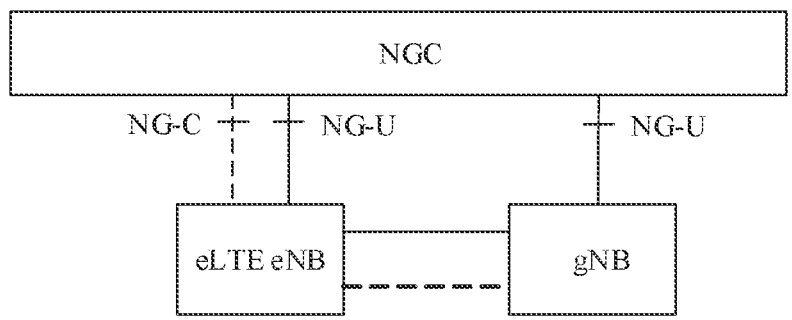
FIG. 7 is a schematic diagram of a first interface and a third interface in an NGEN-DC architecture in an SCG-side service processing method in a dual connectivity scenario according to an embodiment of the present invention.
Figure 8:
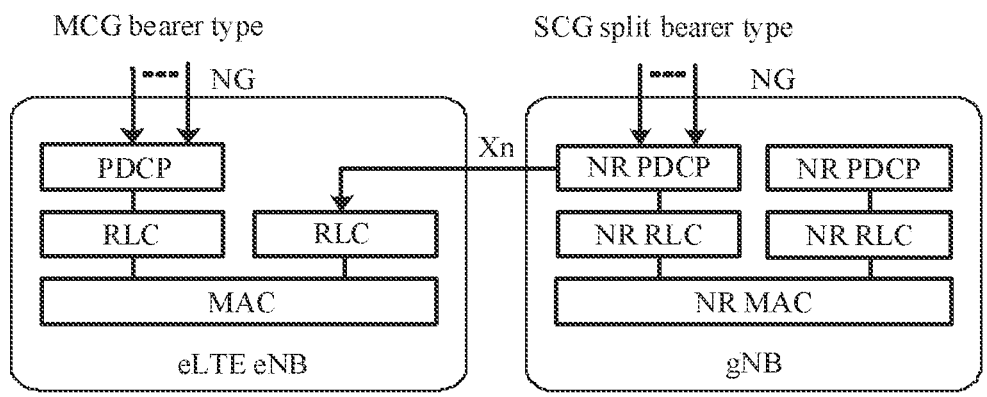
FIG. 8 is a schematic diagram of a split beater in an NGEN-DC architecture in an SCG-side service processing method in a dual connectivity scenario according to an embodiment of the present invention.

FIG. 7 is a schematic diagram of a first interface and a third interface in an NGEN-DC architecture in an SCG-side service processing method in a dual connectivity scenario according to an embodiment of the present invention. FIG. 8 is a schematic diagram of a split beater in an NGEN-DC architecture in an SCG-side service processing method in a dual connectivity scenario according to an embodiment of the present invention. Referring to FIG. 7 and FIG. 8, when the NGEN-DC architecture is used, an MN is an eLTE eNB, an SN is a gNB, a core network is a new radio core (NG Core, NGC) network, a first interface may include a control plane interface NG-C and a data plane interface NG-U, a second interface may be a data plane interface NG-U, and a third interface between the MN and the SN may be an Xn interface. In the figure, a solid line is a control plane interface, a dashed line is a data plane interface, and the gNB is a split point.

Figure 9:
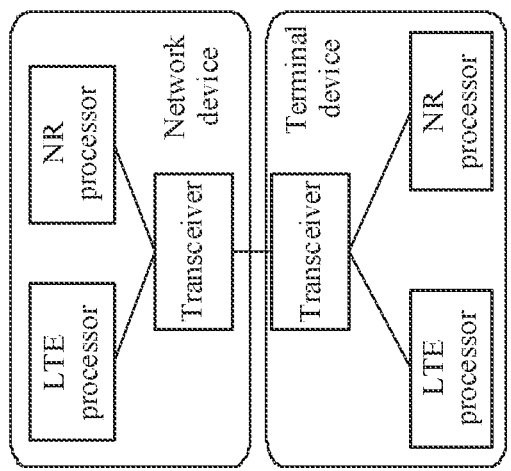
FIG. 9 is a schematic diagram of deployment of an MN and an SN in an SCG-side service processing method in a dual connectivity scenario according to an embodiment of the present invention.
Figure 9:
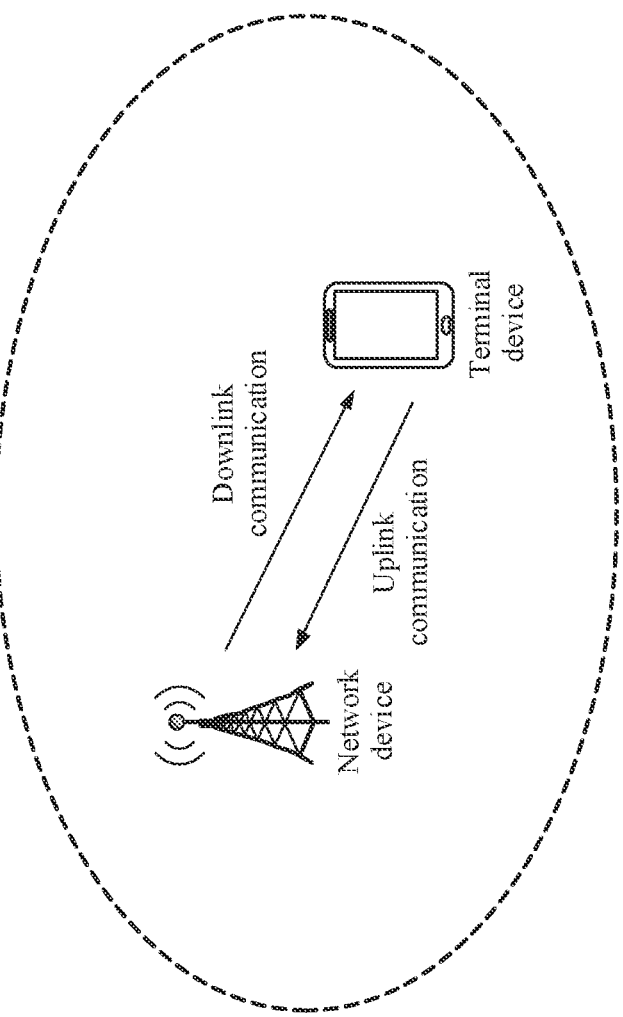
Figure 10:
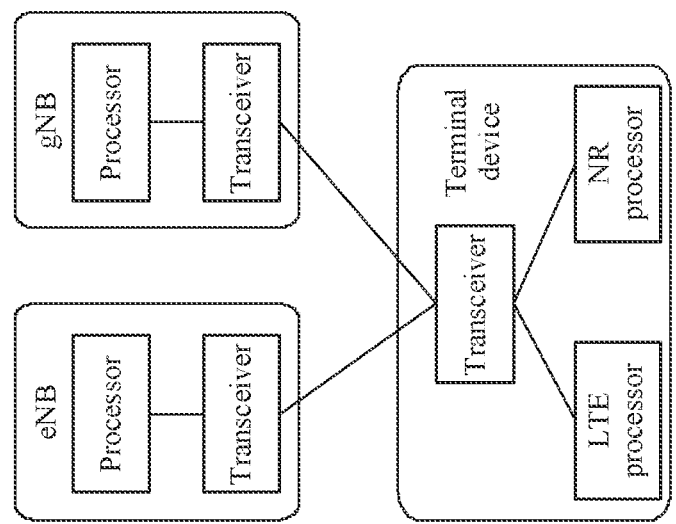
FIG. 10 is another schematic diagram of deployment of an MN and an SN in an SCG-side service processing method in a dual connectivity scenario according to an embodiment of the present invention.
Figure 10:
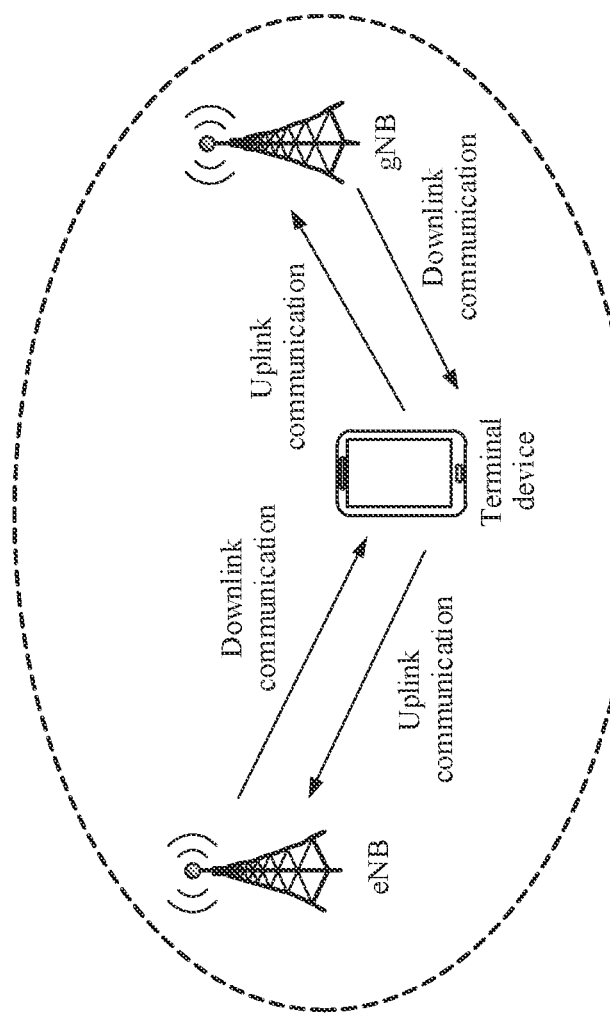

In the embodiments of this application, the MN and the SN may be deployed on a same station or deployed separately. For example, FIG. 9 is a schematic diagram of deployment of an MN and an SN in an SCG-side service processing method in a dual connectivity scenario according to an embodiment of the present invention, and FIG. 10 is another schematic diagram of deployment of an MN and an SN in an SCG-side service processing method in a dual connectivity scenario according to an embodiment of the present invention. Referring to FIG. 9, the MN and the SN are deployed on a same station. In this case, the MN and the SN share a same set of hardware devices such as a processor and a transceiver. An LTE network device may be an LTE network device connected to EPC, or may be a network device connected to 5G NGC. Referring to FIG. 10, the MN and the SN are deployed on different stations. In this case, the MN and the SN use different hardware devices such as a processor and a transceiver.

Figure 11:
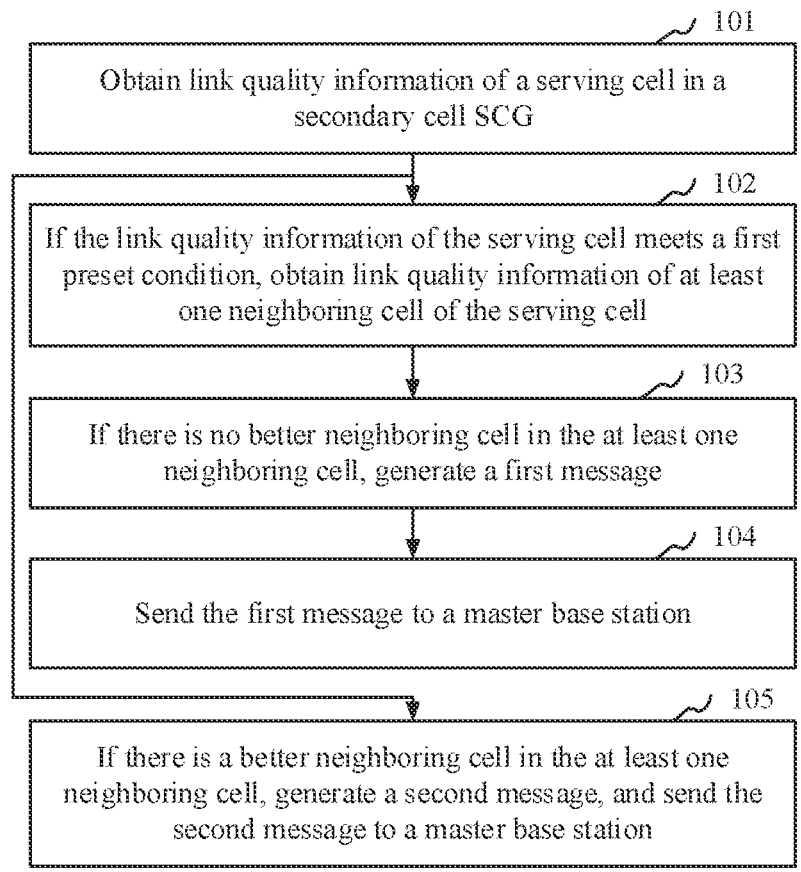
FIG. 11 is a flowchart of an SCG-side service processing method in a dual connectivity scenario according to an embodiment of this application.

The following describes in detail the SCG-side service processing method in a dual connectivity scenario in the embodiments of this application. For example, FIG. 11 is a flowchart of an SCG-side service processing method in a dual connectivity scenario according to an embodiment of this application. This embodiment is described in detail from a perspective of a terminal device. This embodiment includes the following steps.

101. Obtain link quality information of a serving cell in a secondary cell SCG.

For example, the terminal device establishes a connection to both a master base station and a secondary base station, and an MCG and an SCG are configured for the terminal device. The terminal device may obtain link quality information of a serving cell in the SG. For example, the terminal device may obtain reference signal received power (reference signal received power, RSRP), a received signal strength indicator (received signal strength indicator, RSSI), reference signal received quality (reference signal received quality, RSRQ), and the like of the serving cell, and determine whether the information meets a first preset condition. If the information meets the first preset condition, the terminal device considers that link quality of the serving cell is poor.

102. If the link quality information of the serving cell meets the first preset condition, obtain link quality information of at least one neighboring cell of the serving cell.

For example, when determining that the link quality information of the serving cell meets the first preset condition, the terminal device measures RSRP, RSRQ, a signal to interference plus noise ratio (signal to interference plus noise ratio, SINR), load, or the like of each neighboring cell of the serving cell, to automatically obtain link quality information of the neighboring cell of the serving cell. There may be a plurality of neighboring cells. For example, if the serving cell has five neighboring cells, the terminal device determines link quality information of the five neighboring cells, or the terminal device determines link quality information of some of the five neighboring cells, for example, link quality information of two or three neighboring cells.

If the link quality information of the serving cell meets the first preset condition, it indicates that the link quality of the serving cell in the SCG is good, the terminal device does not need to perform reporting to the master base station, and the master base station does not need to determine whether to release the SCG cell or perform serving cell handover.

103. If there is no better neighboring cell in the at least one neighboring cell, generate a first message.

The better neighboring cell is a neighboring cell whose link quality information meets a second preset condition in the at least one neighboring cell, and the first message carries link quality information determined by the terminal device based on the link quality information of the serving cell.

For example, the terminal device determines, based on the link quality information of the neighboring cell, whether there is a neighboring cell whose link quality meets the second preset condition in the at least one neighboring cell. If there is a neighboring cell whose link quality meets the second preset condition in the at least one neighboring cell, the terminal device uses the neighboring cell as the better neighboring cell. Otherwise, the terminal device considers that there is no better neighboring cell. When the terminal device considers that there is no better neighboring cell, the terminal device determines new link quality information based on the link quality information of the serving cell, and generates the first message by using the new link quality information. The link quality information carried in the first message is original link quality information that is of the serving cell and that is obtained by the terminal device, may be obtained after the terminal device processes original link quality information of the serving cell, or may be a preset value determined by the terminal device. A specific representation of the link quality information carried in the first message is not limited in this embodiment of this application. Compared with the original link quality information of the serving cell, the link quality information carried in the first message more easily enables the master base station to determine whether to release the SCG.

For example, in an EN-DC architecture, a frequency band corresponding to an eNB is lower than a frequency band corresponding to a gNB, coverage of the gNB is discontinuous, parameter configuration of the gNB is improper, and the like. Therefore, when a service data amount of the terminal device is relatively large and a split bearer is used, poor quality of service more likely occurs on an SCG side, and the eNB cannot trigger SCG release and the like. In this case, if the terminal device determines that there is no neighboring cell whose link quality information meets the second preset condition in the at least one neighboring cell, in other words, there is no better neighboring cell, the terminal device reports, to the master base station, the new link quality information determined based on the link quality information of the serving cell, so that the master base station can determine whether to release the SCG. If the master base station releases the SCG, the master base station may indicate the terminal device to transmit uplink and downlink data by using an MCG bearer. Alternatively, if the master base station does not release the SCG and the split bearer is still used, a split point may allocate less uplink and downlink data to the SCG side. For another example, in an NE-DC architecture, coverage of a base station on an SCG side is discontinuous, parameter configuration of the base station is improper, and the like. Therefore, when a service data amount of the terminal device is relatively large and a split bearer is used, poor quality of service more likely occurs on the SCG side. In this case, if the terminal device determines that there is no neighboring cell whose link quality information meets the second preset condition in the at least one neighboring cell, in other words, there is no better neighboring cell, the terminal device reports, to the master base station, the new link quality information determined based on the link quality information of the serving cell, so that the master base station determines whether to release the MCG. If the master base station releases the SCG, the master base station indicates the terminal device to transmit uplink and downlink data by using an MCG bearer. Alternatively, if the master base station does not release the SCG and the split bearer is still used, a split point allocates less uplink and downlink data to the SCG.

An example in which the serving cell has five neighboring cells, the five neighboring cells are intra-frequency neighboring cells of the serving cell, and the link quality information is RSRP is used. The five neighboring cells are a neighboring cell 1 to a neighboring cell 5. The terminal device determines, through measurement, that RSRP of the five neighboring cells is successively −80 dBm, −82 dBm, −85 dBm, −88 dBm, and −90 dBm, and RSRP of the serving cell is −79 dBm. It is assumed that the second preset condition is Mn+a first compensated RSRP value+Ofn+Ocn−Hys>Mp+Ofp+Ocp+Off. Mn represents the RSRP of the neighboring cell, Mp is the RSRP of the serving cell, the first compensated RSRP value is a preset value or a dynamic value, for example, 5 dBm, Ofn represents a frequency offset (which is 0 dBm when the neighboring cell is an intra-frequency neighboring cell of the serving cell) of the neighboring cell, Ocn represents a cell offset (which is 0 dBm when the neighboring cell is an intra-frequency neighboring cell of the serving cell) of the neighboring cell, Hys represents an amplitude hysteresis (for example, 2 dBm) of a measurement structure, Ofp represents a frequency offset (which is 0 dBm when the neighboring cell is an intra-frequency neighboring cell of the serving cell) of the serving cell, Ocp represents a cell offset (which is 0 dBm when the neighboring cell is an intra-frequency neighboring cell of the serving cell) of the serving cell, and off represents an offset (for example, 1 dBm) of a measurement result. In this case, the RSRP of the neighboring cell 1 is substituted into the second preset condition to obtain −80+5+0+0−2>−70+0+0+1. Therefore, the neighboring cell 1 may be used as a best neighboring cell of the serving cell.

It should be noted that when the serving cell has a plurality of neighboring cells, the terminal device may select a neighboring cell with largest RSRP from the plurality of neighboring cells, and then determine whether the neighboring cell with the largest RSRP can be used as the best neighboring cell. Alternatively, the terminal device may randomly select a neighboring cell from the plurality of neighboring cells, and then determine whether the neighboring cell can be used as the best neighboring cell.

104. Send the first message to the master base station.

105. If there is a better neighboring cell in the at least one neighboring cell, generate a second message, and send the second message to the master base station, where the second message carries link quality information determined by the terminal device based on the link quality information of the better neighboring cell.

For example, after the terminal device obtains the link quality information of the at least one neighboring cell, if there is no better neighboring cell in the at least one neighboring cell, the terminal device performs step 103; or if there is a better neighboring cell in at least one neighboring cell, the terminal device performs step 105, that is, the terminal device determines new link quality information based on the link quality information of the better neighboring cell, generates the second message based on the new link quality information, and sends the second message to the master base station. To be specific, the link quality information carried in the second message may be original link quality information of the better neighboring cell, may be obtained after the terminal device processes original link quality information of the better neighboring cell, or may be a preset value determined by the terminal device. After receiving the second message, the master base station determines, based on the second message, whether to send a handover message to the terminal device to trigger the terminal device to be handed over from the serving cell to the better neighboring cell.

The SCG-side service processing method in a dual connectivity scenario provided in this embodiment of the present invention is applied to the terminal device in the dual connectivity scenario. The master base station configures the master cell group and the secondary cell group for the terminal device. In uplink and downlink data transmission processes, when determining that the link quality information of the serving cell in the SCG meets the first preset condition, the terminal device obtains the link quality information of the at least one neighboring cell of the serving cell; determines, based on the link quality information, whether there is a better neighboring cell; and if there is no better neighboring cell, sends the first message to the master base station. The master base station determines, based on the first message, whether to release the SCG cell group. In this process, when the link quality information of the serving cell in the SCG meets the first preset condition, in other words, when the quality of service on the SCG side is poor, because the terminal device can promptly send, to the master base station, the link quality information determined based on the link quality information of the serving cell, the master base station promptly determines whether to release the SCG and the like. This prevents the terminal device from continuing to transmit uplink and downlink data based on the serving cell.

In the foregoing embodiment, if there is a better neighboring cell in the at least one neighboring cell, the terminal device sends the second message to the master base station. The second message carries the link quality information determined by the terminal device based on the link quality information of the better neighboring cell.

For example, if the terminal device finds that there is a neighboring cell whose link quality information meets the second preset condition in the at least one neighboring cell, the terminal device sends, to the master base station, the second message that carries the link quality information determined by the terminal device based on the link quality information of the better neighboring cell. After receiving the second message, the master base station determines, based on the second message, whether to send the handover message to the terminal device to trigger the terminal device to be handed over from the serving cell to the better neighboring cell.

In this embodiment, the terminal device sends the second message to the master base station, so that the master base station promptly determines whether to send the handover message to the terminal device to enable the terminal device to be handed over to the better neighboring cell. This ensures a success rate in uplink and downlink data transmission, and avoids high power consumption of the terminal device while improving uplink and downlink quality of service.

The following separately describes in detail the foregoing SCG-side service processing method in a dual connectivity scenario by using an example in which a dual connectivity architecture is an EN-DC architecture, an NGEN-DC architecture, and an NE-DC architecture.

First, the dual connectivity architecture is an EN-DC architecture.

In the EN-DC architecture, for a terminal device, an side indicates processing related to an MeNB or an MCG, such as an LTE air interface, LTE-related signaling, and an LTE-related internal bearer (bearer) at each layer, an NR side indicates processing related to an SgNB or an SCG, such as an NR air interface, NR-related signaling, an NR-related data bearer (bearer) at each layer; and a network side indicates the LTE side and/or the NR side, and may also be referred to as the MCG and/or the SCG, the MeNB and/or the SgNB, a PCell and/or an SPCell, and the like.

When no SRB3 is configured on the NR side, all signaling on the NR side is delivered by using the eNB. In this case, a measurement control message generated by a measurement control module of the gNB is transmitted to the eNB through an X2 interface, and the eNB delivers the measurement control message to the terminal device. The terminal device reports a measurement result to the eNB, and the eNB transmits the measurement report to the gNB through the X2 interface to perform a PSCell change process, namely, a serving cell handover process. When an SRB3 is configured on the NR side, some signaling of the terminal device may be sent to the gNB by using the SRB3.

The EN-DC architecture includes an option3 architecture, an option3a architecture, an option3x architecture, and the like. When the option3x architecture is used, the terminal device first accesses the eNB, then receives the SgNB configured by the eNB by using an SgNB addition (addition) process, and accesses the SgNB, to form dual connectivity. A bearer type borne in dual connectivity is a split bearer, and a user plane (user plane, UP) split point is located at the SgNB. When the option3 architecture is used, the UP split point is located at the eNB. The following describes in detail the foregoing SCG-side service processing method in a dual connectivity scenario by using an example in which the EN-DC architecture is specifically the option3x architecture. For example, referring to FIG. 12 and FIG. 13, FIG. 12 is a schematic diagram of an option3x network architecture to which an SCG-side service processing method in a dual connectivity scenario is applicable according to an embodiment of this application.

Figure 12:
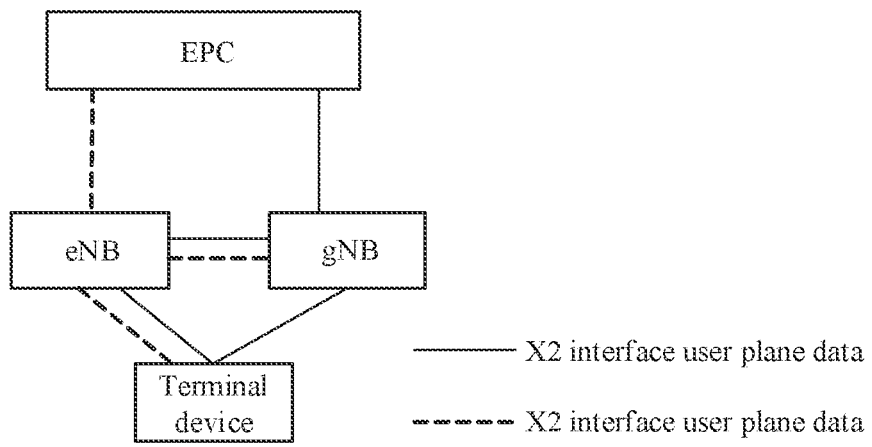
FIG. 12 is a schematic diagram of an option3x network architecture to which an SCG-side service processing method in a dual connectivity scenario is applicable according to an embodiment of this application.

Referring to FIG. 12, an LTE eNB is an MeNB, a 5G gNB is used as an SgNB, and a core network is an evolved packet core (evolved packet core, EPC). In the figure, a dashed line is control plane data, and a solid line is user plane data.

Figure 13:
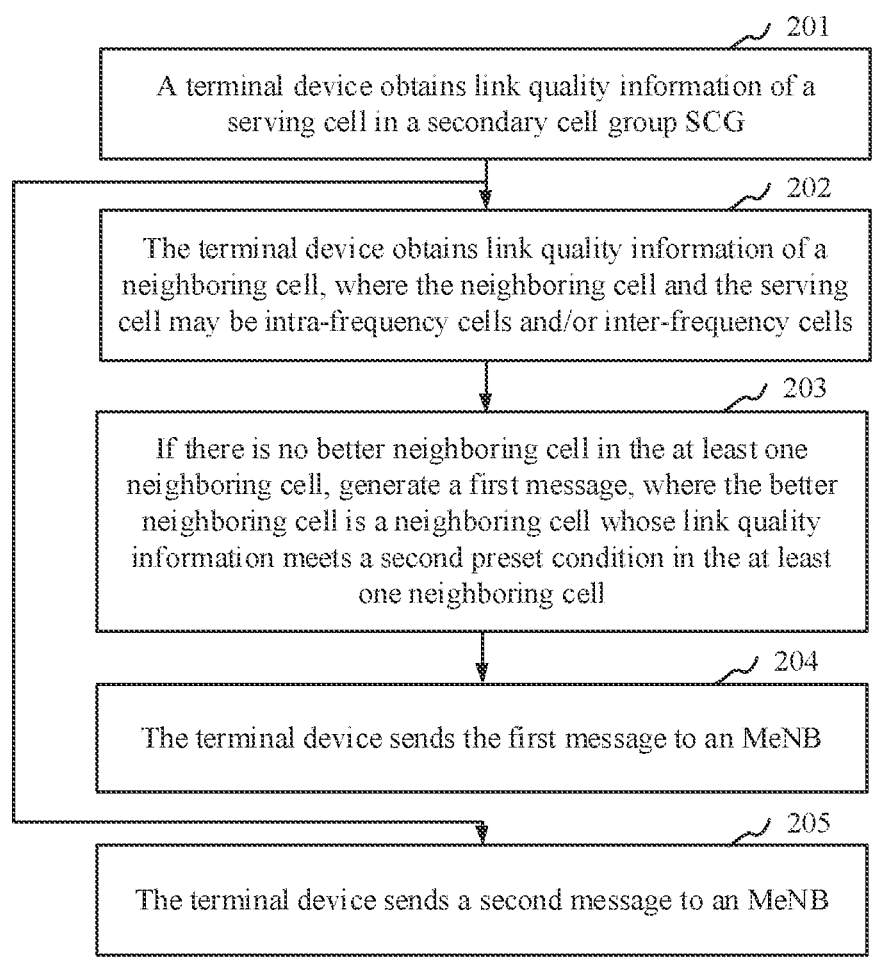
FIG. 13 is a flowchart of another SCG-side service processing method in a dual connectivity scenario according to an embodiment of this application.

FIG. 13 is a flowchart of another SCG-side service processing method in a dual connectivity scenario according to an embodiment of this application. This embodiment is described in detail from a perspective of a terminal device. This embodiment includes the following steps.

201. A terminal device obtains link quality information of a serving cell in a secondary cell group SCG.

For example, in uplink and downlink data transmission processes, if link quality on an NR side is poor, it indicates that quality of the serving cell in the SCG is poor. The terminal device obtains the link quality information of the serving cell in the secondary cell group SCG. When the link quality information of the serving cell meets a first preset condition, for example, when the terminal device determines that air interface signal quality on the NR side is relatively poor, out-of-synchronization frequently occurs on the NR side, scheduling on the NR side is less, and a bit error rate on the NR side is relatively high, the terminal device determines that the link quality on the NR side is poor.

In this embodiment of this application, the link quality information of the serving cell includes one or more pieces of the following information: a quantity of starting times of a timer T313 corresponding to a cell in the SCG, running duration of a timer T313 corresponding to a cell in the SCG, a quantity of out-of-synchronization out of sync events in a cell in the SCG, a throughput of data transmitted in a cell in the SCG, a ratio of a throughput of data transmitted in a cell in the SCG to a power consumption amount, a quantity of beam failures triggered in a cell in the SCG, an amount of data buffered at a radio link control (radio link control, RLC) layer corresponding to a cell in the SCG, a latency of uplink data sent on a link in a cell in the SCG, a signal strength of a cell in the SCG, a signal strength change amplitude of a cell in the SCG, a retransmission rate of data transmitted on a link in a cell in the SCG, a signal to interference plus noise ratio SINR of a cell in the SCG, a modulation and coding scheme (modulation and coding scheme, MCS) index (index) corresponding to a cell in the SCG, or a block error rate BLER in sending downlink data and/or receiving uplink data in a cell in the SCG. Correspondingly, the first preset condition may be a first threshold to a fourteenth threshold. The terminal device may obtain one or more pieces of the foregoing information, and determine, based on any one or a combination of the following manners, whether the link quality information of the serving cell meets the first preset condition. The following describes in detail these manners.

Manner 1: The first preset condition includes the first threshold, and the terminal device determines that the quantity of starting times of the timer T313 corresponding to the cell in the SCG exceeds the first threshold. The cell in the SCG may be a serving cell or a non-serving cell in the SCG.

For example, the terminal device determines that the quantity of times of running T313 corresponding to the cell in the SCG within a detection time window reaches a preset threshold of a quantity of starting times of T313, and the preset threshold of the quantity of starting times of T313 is the first threshold. In some other embodiments, the first threshold may be configured by a base station, or the first threshold varies with a communication environment. This is not limited in this embodiment of this application.

In an implementation, the terminal device counts the quantity of starting times of T313 within the detection time window. For example, within the detection time window, a counter is increased by 1 each time T313 is started. The detection time window may be a sliding time window, indicating a most recent time window. An example in which the detection time window is set to 30 seconds is used. The terminal device counts a quantity of starting times of T313 form a moment 30 s before a current moment to the current moment, and compares the quantity of starting times of T313 with the preset threshold of the quantity of starting times of T313. The preset threshold of the quantity of starting times of T313 may be a threshold that is set inside the terminal device. The threshold may be a fixed value that is set inside the terminal device, or may be a value that is dynamically set. For example, the terminal device dynamically sets the preset threshold of the quantity of starting times of T313 based on one or a combination of power consumption information, air interface environment information (for example, interference of a current environment or signal quality of the serving cell), signal quality information (for example, RSRP, RSRQ, or an SINR of the neighboring cell) of the neighboring cell, configuration information (for example, a measurement report triggering threshold that is set in the serving cell) of the serving cell, and the like. When a lower layer of the terminal device detects N313 consecutive out-of-synchronization (out-of-sync) events on a PSCell side, the terminal device starts T313. If the terminal device measures N314 consecutive in-synchronization (in-sync) events before T313 expires, the terminal device stops timing of T313.

For example, a cell in the SCG is a serving cell, and the first threshold is 10 times. When the terminal device detects, within the detection time window that the timer T313 is started for more than 10 times, the terminal device considers that the link quality on the SCG side is poor.

It should be noted that a person skilled in the art may understand that, in an aspect, the terminal device may internally determine the out-of-sync/in-sync event in a plurality of manners. For example, the terminal device uses a synchronization signal block (synchronization signal block, SSB) indicated in a radio link monitoring (radio link monitoring, RLM) reference signal resource configured on the network side, maps the SSB to a corresponding SSB block error rate (Block Error Ratio, BLER), and compares the SSB BLER with an out-of-synchronization threshold (Qout)/an in-synchronization threshold (Qin), to determine whether to trigger out-of-sync/in-sync indication reporting, Qout is an out-of-sync triggering threshold, and Qin is an in-sync triggering threshold. Alternatively, the terminal device maps a channel state information-reference signal (channel state information-reference signal, CSI-RS) in RLM to a corresponding CSI-RS BLER, and compares the CSI-RS BLER with Qout/Qin, to determine whether to trigger out-of-sync/in-sync indication reporting. Alternatively, information such as a signal-to-noise ratio (signal noise ratio, SNR) may be used. Details are not described herein. The terminal device maps the information to the corresponding SSB BLER and/or the corresponding CSI-RS BLER, and then uses the SSB BLER and/or the CSI-RS BLER to compare the SSB BLER and/or the CSI-RS BLER with Qout/Qin, to determine whether to trigger out-of-sync/in-sync indication reporting. In another aspect, the terminal device may internally set, based on a situation of the terminal device, a parameter and/or a threshold for triggering out-of-sync/in-sync indication reporting in actual application. In other words, the terminal device does not use the parameter Qout/Qin configured on the network side. In still another aspect, the terminal device may internally adjust an actual use value of N313 or N314, for example, moderately increase or decrease N313 or N314 configured on the network side. In other words, the present invention sets no limitation on a specific implementation of determining the out-of-sync/in-sync event. Unless otherwise specified, settings related to T313, N313, N314, and detection and reporting of the out-of-sync/in-sync event in the present invention all follow this principle.

A person skilled in the art may understand that if the terminal device detects that the quantity of starting times of T313 reaches the preset threshold of the quantity of starting times of T313, it indicates that a large quantity of out-of-sync events are triggered at the lower layer. This may reflect that transmission quality on the NR side is relatively poor currently. For example, the terminal device internally sets the preset threshold of the quantity of starting times of T313 to 10. If the terminal device detects, within the 30 s detection time window, that T313 is started for 10 times, the terminal device determines that the link quality on the NR side is relatively poor currently.

In this manner, for a configuration manner, a starting manner, and a resetting manner of T313, refer to descriptions in 3GPP TS 38. Details are not described herein again.

Manner 2: The first preset condition includes the second threshold, and the terminal device determines that the running duration of the timer T313 corresponding to the cell in the SCG exceeds the second threshold. The cell in the SCG may be a serving cell or a non-serving cell in the SCG.

For example, the UE determines that the running duration of T313 corresponding to the cell in the SCG within a detection time window reaches a preset T313 running duration threshold, and the preset T313 running duration threshold is the second threshold.

In a first possible implementation, an example in which the cell in the SCG is a serving cell is used. Within the detection time window the terminal device counts duration in which the timer runs after T313 is started each time, and calculates, as the running duration of T313, a total sum thereof by performing an addition operation. The detection time window may be a sliding time window, indicating a most recent time window. An example in which the detection time window is set to 30 seconds is used. The terminal device counts running duration of the T313 from a moment 30 s before a current moment to the current moment, and compares the running duration with the preset T313 running duration threshold. The preset T313 running duration threshold may be a threshold that is se inside the terminal device. The threshold may be a fixed value that is set inside the terminal device, or may be a dynamic value. For example, the terminal device dynamically sets the preset T313 running duration threshold based on one or a combination of power consumption information, air interface environment information (for example, interference of a current environment or signal quality of the serving cell), signal quality information (for example, RSRP, RSRQ, or an SINR of the neighboring cell) of the neighboring cell, configuration information (for example, a measurement report triggering threshold that is set in the serving cell) of the serving cell, and the like. For a configuration manner, a starting manner, and a resetting manner of T313, refer to descriptions in Manner 1.

It should be noted that a person skilled in the art may understand that if the terminal device detects that the running duration of the T313 reaches the preset T313 running duration threshold, it indicates that a large quantity of out-of-synchronization out-of-sync events are triggered at a lower layer, and consecutive out-of-synchronization events occur for a plurality of times. This may reflect that transmission quality on the NR side is relatively poor currently. For example, the terminal device internally sets the preset T313 running duration threshold to 10 seconds, in other words, the second threshold is 10 seconds. If the terminal device detects, within the 30 s detection time window, that T313 is started for 10 seconds, the terminal device determines that the link quality on the NR side is relatively poor currently. In some other embodiments, the second threshold may be configured by a base station, or the terminal device adjusts the second threshold based on an actual case.

In a second possible implementation, when T313 is started, timing is started for the detection time window. The preset T313 running duration threshold is an RLF triggering threshold, and is m % of T313 or is T313-N (N may vary with a value of T313). In other words, the terminal device detects that running duration of T313 at a specified time reaches the threshold. For example, the preset T313 running duration threshold is set to 80% of T313, or the preset T313 running duration threshold is set to T313-20 ms. If the terminal device detects that timing duration of T313 reaches the preset T313 running duration threshold that is set above, it indicates that the NR side currently approaches the RLF triggering threshold, and is about to reach an SCG failure determining threshold. This may be used as a basis for determining that the link quality on the NR side is relatively poor. For the preset T313 running duration threshold, refer to the foregoing first possible implementation. Details are not described herein again.

In a third possible implementation, the foregoing first and second possible implementations are combined, that is, total timing duration of T313 is combined with last timing duration of T313 at a current moment as a determining basis. When the total timing duration of T313 meets preset total timing duration that is set by the terminal device, and the last timing duration of T313 meets preset timing duration that is set by the terminal device, the terminal device determines that the link quality on the NR side is relatively poor.

Manner 3: The first preset condition includes the third threshold, and the terminal device determines that the quantity of out-of-synchronization out of sync events in the cell in the SCG exceeds the third threshold. The cell in the SCG may be a serving cell or a non-serving cell in the SCG.

For example, the terminal device determines that the quantity of out-of-sync events in the cell in the SCG within a detection time window reaches a preset out-of-sync quantity threshold. The preset out-of-sync quantity threshold is the third threshold. In some other embodiments, the third threshold may be configured by a base station, or the third threshold varies with a communication environment. This is not limited in this embodiment of this application. The detection time window may be a sliding time window, indicating a most recent time window. In a possible implementation, the terminal device counts the quantity of out-of-sync events within the detection time window. For example, within the detection time window, a counter is increased by 1 each time the out-of-sync event is detected. The detection time window may be a sliding time window, indicating a most recent time window. An example in which the detection time window is set to 30 seconds and the third threshold is 10 times. The terminal device determines, through counting, whether a quantity of out-of-sync events from a moment 30 s before a current moment to the current moment exceeds 10. The preset out-of-sync event quantity threshold may be a threshold that is set inside the terminal device. The threshold may be a fixed value that is set inside the terminal device, or may be a dynamic value. For example, the terminal device dynamically sets the preset out-of-sync event quantity threshold based on one or a combination of power consumption information, air interface environment information (for example, interference of a current environment or signal quality of the serving cell), signal quality information (for example, RSRP, RSRQ, or an SINR of the neighboring cell) of the neighboring cell, configuration information (for example, a measurement report triggering threshold that is set in the serving cell) of the serving cell, and the like. For related settings of a specific out-of-sync event detection manner, refer to Manner 1.

A person skilled in the art may understand that if the terminal device frequently detects the out-of-sync event on the NR side, it may reflect that the link quality on the NR side is relatively poor.

Manner 4: The first preset condition includes the fourth threshold, and the terminal device determines that the throughput of the data transmitted in the cell in the SCG is less than the fourth threshold. The cell in the SCG may be a serving cell or a non-serving cell in the SCG.

For example, the terminal device determines that the throughput of the data transmitted in the cell in the SCG is less than a preset throughput threshold within a detection time window, and the preset throughput threshold is the fourth threshold. The data transmitted in the cell in the SCG includes data transmitted by using an SCG bearer and/or data on a branch on which the secondary base station performs split in case of a split bearer. The detection time window may be a sliding time window indicating a most recent time window. In a possible implementation, the terminal device counts, within the detection time window, an uplink throughput and/or a downlink throughput that are/is reached on a user plane on the NR side. For example, an example in which the fourth threshold is 20 kilobytes (KB) and the detection time window is 60 seconds is used. The terminal device counts, within a most recent detection time window of 60 seconds, a total uplink and downlink throughput reached on the user plane on the NR side, and compares the total uplink and downlink throughput with a preset total uplink and downlink throughput threshold. The preset total uplink and downlink throughput threshold, namely, the fourth threshold, may be a threshold that is set inside the terminal device. For example, the threshold is a fixed value that is set inside the terminal device, or is a value dynamically set by the terminal device. For example, the terminal device dynamically sets the preset total uplink and downlink throughput threshold based on one or a combination of power consumption information, air interface environment information (for example, interference of a current environment or signal quality of the serving cell), signal quality information (for example, RSRP, RSRQ, or an SINR of the neighboring cell) of the neighboring cell, configuration information (for example, a measurement report triggering threshold that is set in the serving cell) of the serving cell, and the like. In addition, in some other embodiments, the fourth threshold may be configured by a base station, or the fourth threshold varies with a communication environment. This is not limited in this embodiment of this application.

A person skilled in the art may understand that, only when a downlink buffer amount on the network side reaches a specified amount, the EN-DC architecture is configured for the terminal device. If the terminal device determines that the total uplink and downlink throughput reached on the NR side is relatively low, it may reflect, to a degree, that the link quality on the NR side is relatively poor.

Manner 5: The first preset condition includes the fifth threshold, and the terminal device determines that the ratio of the throughput of the data transmitted in the cell in the SCG to the power consumption amount is less than the fifth threshold. The cell in the SCG may be a serving cell or a non-serving cell in the SCG.

For example, the terminal device determines that the ratio of the throughput of the data transmitted in the cell in the SCG to the power consumption amount of the terminal device is less than a preset throughput-to-power consumption amount ratio threshold within a detection time window, and the preset throughput-to-power consumption amount ratio threshold is the fifth threshold. The data transmitted in the cell in the SCG includes data transmitted by using an SCG bearer and/or data on a branch on which the secondary base station performs split in case of a split bearer. The detection time window may be a sliding time window, indicating a most recent time window. In a possible implementation, the terminal device counts, within the detection time window, an uplink throughput and/or a downlink throughput that are/is reached on a user plane on the NR side. For example, the terminal device counts, within a most recent time window of 60 seconds, a total uplink and downlink throughput reached on the user plane on the NR side and a power consumption amount of the terminal device within 60 s, obtains a ratio p through calculation according to a formula p=total uplink and downlink throughput/power consumption amount of the terminal device, and compares the ratio with the preset throughput-to-power consumption amount ratio threshold. The preset throughput-to-power consumption amount ratio threshold may be a threshold that is set inside the terminal device. For example, the threshold is a fixed value that is set inside the terminal device, or is a value dynamically set by the terminal device. For example, the terminal device dynamically sets the preset throughput-to-power consumption amount ratio threshold based on one or a combination of power consumption information, air interface environment information (for example, interference of a current environment or signal quality of the serving cell), signal quality information (for example, RSRP, RSRQ, or an SINR of the neighboring cell) of the neighboring cell, configuration information (for example, a measurement report triggering threshold that is set in the serving cell) of the serving cell, and the like. In addition, in some other embodiments, the fifth threshold may be configured by a base station, or the fifth threshold varies with a communication environment. This is not limited in this embodiment of this application.

An example in which the cell in the SCG is a serving cell and the fifth threshold is 2% is used. The terminal device detects whether the ratio of the total uplink and downlink throughput to the power consumption amount of the terminal device is less than 2%. If the ratio is less than 2%, it indicates that the quality of service on the SCG side is poor.

A person skilled in the art may understand that, usually, only when a downlink buffer amount on the network side reaches a specified amount, the EN-DC architecture is configured for the terminal device. If terminal device determines that the total uplink and downlink throughput reached on the NR side is relatively low and the power consumption amount of the terminal device is relatively high, it may reflect, to a degree, that the link quality on the NR side is relatively poor.

Manner 6: The first preset condition includes the sixth threshold, and the terminal device determines that the quantity of beam failures triggered in the cell in the SCG exceeds the sixth threshold. The cell in the SCG may be a serving cell or a non-serving cell in the SCG.

For example, the terminal device determines that the quantity of beam failures (beam failure) triggered in the cell in the SCG reaches a preset beam failure threshold within a detection time window. The preset beam failure threshold is the sixth threshold. In a possible implementation, the terminal device counts the quantity of beam failures within the detection time window. For example, within the detection time window, a counter is increased by 1 each time the beam failure is detected. The detection time window may be a sliding time window, indicating a most recent time window. An example in which the detection time window is set to 30 seconds is used. The terminal device counts a quantity of beam failures from a moment 30 s before a current moment to the current moment, and compares the quantity with the preset beam failure quantity threshold. The preset beam failure threshold may be a threshold that is set inside the terminal device, and the threshold may be a fixed value that is set inside the terminal device, or may be a value dynamically set by the terminal device. For example, the terminal device dynamically sets the preset beam failure threshold based on one or a combination of power consumption information, air interface environment information (for example, interference of a current environment or signal quality of the serving cell), signal quality information (for example, RSRP, RSRQ, or an SINR of the neighboring cell) of the neighboring cell, configuration information (for example, a measurement report triggering threshold that is set in the serving cell) of the serving cell, and the like. In addition, in some other embodiments, the sixth threshold may be configured by a base station, or the sixth threshold varies with a communication environment. This is not limited in this embodiment of this application.

A person skilled in the art may understand that, in an aspect, the terminal device may internally determine the beam failure in plurality of manners. For example, the terminal device uses information such as an SSB and/or a CSI-RS demodulation signal that are/is in a beam failure detection reference signal resource configured on the network side, and a signal-to-noise ratio (Signal to Noise Ratio, SNR), maps the information to a corresponding SSB BLER and/or a corresponding CSI-RS BLER, and then compares the SSB BLER and/or the CSI-RS BLER with a threshold (represented as Qout-LR), to determine whether to trigger beam failure instance (beam failure instance) indication reporting. In another aspect, the terminal device may internally set a parameter and/or a threshold for triggering beam failure instance indication reporting in actual application. In other words, the terminal device does not use the parameter Qout-LR configured on the network side. A specific implementation of determining a beam failure instance event is not limited in this application. Unless otherwise specified, settings related detection and reporting of the beam failure instance in this application all follow this principle.

Manner 7: The first preset condition includes the seventh threshold, and the terminal device determines that the amount of data buffered at the radio link control RLC layer corresponding to the cell in the SCG exceeds the seventh threshold. The cell in the SCG may be a serving cell or a non-serving cell in the SCG.

For example, the terminal device determines that the buffer amount at the RLC layer corresponding to the cell in the SCG exceeds a preset buffer (buffer) threshold, and the preset buffer threshold is the seventh threshold. In a first possible implementation, the terminal device detects that a buffer amount at an NR RLC layer of any bearer in established bearers exceeds the preset buffer threshold, and the bearer includes a branch on which the secondary base station performs split in case of an SCG bearer or a split bearer. For example, the seventh threshold is 80%. If the buffer amount at the NR RLC layer of the any bearer exceeds 80%, the terminal device considers that the quality on the SCG side is poor. In a second possible implementation, the terminal device detects that buffer amounts at NR RLC layers of all bearers in established bearers exceeds the preset buffer threshold. The preset buffer threshold may be a threshold that is set inside the terminal device. For example, the threshold is a fixed value that is set inside the terminal device, or is a value dynamically set by the terminal device. For example, the terminal device dynamically sets the preset buffer threshold based on one or a combination of power consumption information, air interface environment information (for example, interference of a current environment or signal quality of the serving cell), signal quality information (for example, RSRP, RSRQ, or an SINR of the neighboring cell) of the neighboring cell, configuration information (for example, a measurement report triggering threshold that is set in the serving cell) of the serving cell, and the like. In addition, in some other embodiments, the seventh threshold may be configured by a base station, or the seventh threshold varies with a communication environment. This is not limited in this embodiment of this application.

A person skilled in the art may understand that, when the buffer amount at the RLC layer on the NR side is relatively large, it may reflect that air interface link quality on the NR side decreases or the SCG schedules fewer UL grant resources, in other words, the link quality on the NR side is relatively poor.

Manner 8: The first preset condition includes the eighth threshold, and the terminal device determines that the latency of the uplink data sent on the link in the cell in the SCG exceeds the eighth threshold. The cell in the SCG may be a serving cell or a non-serving cell in the SCG.

For example, the terminal device determines that an uplink data transmission latency in the cell in the SCG exceeds a preset uplink latency threshold, and the preset uplink latency threshold is the eighth threshold. In a first possible implementation, the terminal device counts, within a time period, duration used from sending several transmission control protocol (transmission control protocol, TCP) packets from the NR side to receiving corresponding TCP positive acknowledgements (acknowledgement, ACK), obtains a final result value according to a smoothing algorithm, uses the final result value as the uplink data transmission latency, and compares the uplink data transmission latency with the preset uplink latency threshold. For example, the eighth threshold is 100 milliseconds. If the terminal device determines, based on an ACK received within a time period, that the uplink data transmission latency exceeds 100 milliseconds, the terminal device considers that the quality of service on the SCG side is poor. In a second possible implementation, the terminal device counts duration consumed from sending data to a buffer at a layer (layer) 2, for example, submitting data from an IP layer to a PDCP layer, to receiving a hybrid automatic repeat request (hybrid automatic repeat request, HARQ) indication from the network side, and uses the duration as the uplink data transmission latency. Alternatively, the terminal device performs counting for a plurality of times, obtains a final result according to a smoothing algorithm, uses the final result as the uplink data transmission latency, and compares the uplink data transmission latency with the preset uplink latency threshold. It should be noted that the HARQ indication on the network side may be an implicit indication or an explicit indication. If uplink transmission of the terminal device fails, the current uplink data transmission latency may be set to a preset value. For example, the eighth threshold is 100 milliseconds. If the terminal device determines that the duration consumed for receiving the HARQ exceeds 100 milliseconds, the terminal device considers that the quality of service on the SCG side is poor. In a third possible implementation, the terminal device sends a latency test packet to the SCG, for example, a ping packet, counts a round trip time (round trip time, RTT) to obtain a latency result, and uses the latency result as the uplink data transmission latency. The preset uplink latency threshold may be a threshold that is set inside the terminal device. For example, the threshold is a fixed value that is set inside the terminal device, or is a value dynamically set by the terminal device. For example, the terminal device dynamically sets the preset uplink latency threshold based on one or a combination of power consumption information, air interface environment information (for example, interference of a current environment or signal quality of the serving cell), signal quality information (for example, RSRP, RSRQ, or an SINR of the neighboring cell) of the neighboring cell, configuration information (for example, a measurement report triggering threshold that is set in the serving cell) of the serving cell, and the like. In addition, in some other embodiments, the eighth threshold may be configured by a base station, or the eighth threshold varies with a communication environment. This is not limited in this embodiment of this application.

A person skilled in the art may understand that when the uplink transmission latency of the terminal device is relatively large, it indicates that air interface link quality on the NR side decreases or the SCG schedules fewer uplink grant (UL Grant) resources, in other words, the link quality on the NR side is relatively poor.

Manner 9: The first preset condition includes the ninth threshold, and the terminal device determines that the signal strength of the cell in the SCG is less than the ninth threshold. The cell in the SCG may be a serving cell or a non-serving cell in the SCG.

For example, the terminal device determines that the signal strength of the cell in the SCG is less than a preset signal strength threshold, and the preset signal strength threshold is the ninth threshold. In a possible implementation, the terminal device detects a signal strength of a reference signal (such as an SSB or a channel state information-reference signal (Channel State Information-Reference Signal, CSI-RS)) in a PSCell in the SCG. The terminal device may perform detection for a plurality of times, obtain a signal strength value through smoothing, and compare the signal strength value with the preset signal strength threshold. The preset signal strength threshold may be a threshold that is set inside the terminal device. For example, the threshold is a fixed value that is set inside the terminal device, or is a value dynamically set by the terminal device. For example, the terminal device dynamically sets the preset signal strength threshold based on one or a combination of power consumption information, air interface environment information (for example, interference of a current environment or signal quality of the serving cell), signal quality information (for example, RSRP or RSRQ of the neighboring cell) of the neighboring cell, configuration information (for example, a measurement report triggering threshold that is set in the serving cell) of the serving cell, and the like. In addition, in some other embodiments, the ninth threshold may be configured by a base station, or the ninth threshold varies with a communication environment. This is not limited in this embodiment of this application.

An example in which the cell in the SCG is a serving cell and the signal strength is measured by using RSRP is used. It is assumed that the ninth threshold is −80 dBm. If the terminal device detects that RSRP of a CSI-RS in the serving cell is less than −80 dBm, the terminal device considers that the quality of service on the SCG side is poor.

A person skilled in the art may understand that when the signal strength of the cell in the SCG is relatively low, a block error rate or a BLER in link transmission increases, in other words, the link quality on the NR side is relatively poor.

Manner 10: The first preset condition includes the tenth threshold, and the terminal device determines that the signal strength change amplitude of the cell in the SCG exceeds the tenth threshold. The cell in the SCG may be a serving cell or a non-serving cell in the SCG.

For example, the terminal device determines that the signal strength change amplitude of the cell in the SCG is greater than a preset signal strength change threshold, and the preset signal strength change threshold is the tenth threshold. In a possible implementation, the terminal device counts a change value between two adjacent signal strengths of a PSCell, performs recording for a plurality of times, obtains a result according to a smoothing algorithm, uses the result as the signal strength change amplitude of the cell in the SCG, and compares the result with the preset signal strength change threshold. The preset signal strength change threshold may be a threshold that is set inside the terminal device, and the threshold may be a fixed value that is set inside the terminal device, or may be a value dynamically set by the terminal device. For example, the terminal device dynamically sets the preset signal strength change threshold based on one or a combination of power consumption information, air interface environment information (for example, interference of a current environment or signal quality of the serving cell), signal quality information (for example, RSRP, RSRQ, or an SINR of the neighboring cell) of the neighboring cell, configuration information (for example, a measurement report triggering threshold that is set in the serving cell) of the serving cell, and the like. In addition, in some other embodiments, the tenth threshold may be configured by a base station, or the tenth threshold varies with a communication environment. This is not limited in this embodiment of this application.

An example in which the cell in the SCG is a serving cell and the tenth threshold is 10 dBm is used. If the terminal device detects that two adjacent signal strengths of the PSCell of the serving cell are respectively −60 dBm and −80 dBm, a signal strength change value of the PSCell is 20, and exceeds the tenth threshold. In this case, the terminal device considers that the quality of service on the SCG side is poor.

A person skilled in the art may understand that when the signal strength change amplitude of the cell in the SCG is relatively large, a success rate in link transmission in the cell in the SCG is unstable, and a relatively large transmission latency is easily caused, in other words, the link quality on the NR side is relatively poor.

Manner 11: The first preset condition includes the eleventh threshold, and the terminal device determines that the retransmission rate of the data transmitted on the link in the cell in the SCG exceeds the eleventh threshold. The cell in the SCG may be a serving cell or a non-serving cell in the SCG.

For example, the terminal device determines that the retransmission rate of data transmission in the cell in the SCG is greater than a preset retransmission rate threshold, and the preset retransmission rate threshold is the eleventh threshold. In addition, in some other embodiments, the eleventh threshold may be configured by a base station, or the eleventh threshold varies with a communication environment. This is not limited in this embodiment of this application.

In a first possible implementation, the retransmission rate of the data transmission in the cell in the SCG may be a HARQ retransmission rate. For example, the terminal device counts, within a time period, a ratio of a quantity of uplink UL grants used for retransmission on the NR side to a quantity of all UL grants. Further, the terminal device may perform counting for a plurality of times, obtain a final result according to a smoothing algorithm, use the final result as the retransmission rate of the data transmission, and compare the retransmission rate with the preset retransmission rate threshold. For example, the eleventh threshold is 35%. If the terminal device determines that the HARQ retransmission rate exceeds 35%, the terminal device considers that the quality of service on the SCG side is poor.

In a second possible implementation, the retransmission rate of the data transmission in the cell in the SCG may be an RLC layer retransmission rate. The RLC layer retransmission rate may be a downlink RLC data retransmission rate, an uplink RLC data retransmission rate, or an uplink-downlink retransmission rate. The downlink RLC retransmission rate may be a ratio of a quantity of downlink RLC SDU retransmission times to a total quantity of downlink RLC SDU transmission times within a detection time window. Further, the terminal device may obtain a final result according to a sliding algorithm, and use the final result as the downlink RLC layer retransmission rate. The uplink RLC layer retransmission rate is similar to the downlink RLC retransmission rate. The uplink-downlink RLC layer retransmission is obtained by combining the downlink RLC layer retransmission rate and the uplink RLC layer retransmission rate. A possible calculation manner is as follows:

uplink-downlink RLC layer retransmission rate=(downlink RLC effective traffic×downlink RLC data retransmission rate+uplink RLC effective traffic×uplink RLC data retransmission rate)/(downlink RLC effective traffic+uplink RLC effective traffic), where the effective traffic may be a quantity of SKUs sent within the detection time window.

In a third possible implementation, the retransmission rate of the data transmission in the cell in the SCG may be an upper-layer IP packet retransmission rate, for example, a TCP retransmission rate. For a specific counting manner of the retransmission rate, refer to a common counting manner in the industry. Details are not described herein again.

A person skilled in the art may understand that when a retransmission rate existing when the terminal device interacts with the SCG is relatively high, it indicates that air interface link quality easily causes a bit error, in other words, the link quality on the NR side is relatively poor.

Manner 12: The first preset condition includes the twelfth threshold, and the terminal device determines that the signal to interference plus noise ratio (signal to interference plus noise ratio, SINR) of the cell in the SCG is less than the twelfth threshold. The cell in the SCG may be a serving cell or a non-serving cell in the SCG.

For example, the terminal device determines that the SINR of the cell in the SCG is less than a preset SINR threshold, and the preset SINR threshold is the twelfth threshold. In a possible implementation, the terminal device counts a downlink SINR of a serving cell that is on the NR side and in which the terminal device is located. For example, the terminal device obtains the downlink SINR based on RSRP of a reference signal such as an SSB and/or a CSI-RS and interference and noise floor RSRP obtained through measurement. Further, the terminal device may perform processing according to a smoothing algorithm, and use a smoothed SINR as the downlink SINR. The preset SINR threshold may be a threshold that is set inside the terminal device. For example, the threshold is a fixed value that is set inside the terminal device, or is a value dynamically set by the terminal device. For example, the terminal device dynamically sets the preset SINR threshold based on one or a combination of power consumption information, air interface environment information (for example, interference of a current environment or signal quality of the serving cell), signal quality information (for example, RSRP, RSRQ, or an SINR of the neighboring cell) of the neighboring cell, configuration information (for example, a measurement report triggering threshold that is set in the serving cell) of the serving cell, and the like. In addition, in some other embodiments, the twelfth threshold may be configured by a base station, or the twelfth threshold varies with a communication environment. This is not limited in this embodiment of this application.

An example in which the cell in the SCG is a serving cell and the twelfth threshold is 10 dB is used. If the terminal device determines that the SINR of the serving cell is less than 10 dB, the terminal device considers that the link quality on the SCG side is poor.

A person skilled in the art may understand that when the SINR of the cell in the SCG is relatively low, a block error rate in link transmission is relatively high, in other words, the link quality on the NR side is relatively poor.

Manner 13: The first preset condition includes the thirteenth threshold, and the terminal device determines that the modulation and coding scheme (modulation and coding scheme, MCS) index (index) corresponding to the cell in the SCG is less than the thirteenth threshold. The MCS index is an MCS index for sending downlink data by the secondary base station and/or an MCS index for receiving uplink data by the secondary base station. The cell in the SCG may be a serving cell or a non-serving cell in the SCG.

For example, the terminal device determines that a downlink MCS index and/or an uplink MCS index corresponding to the cell in the SCG are/is less than a preset MCS index threshold, and the preset MCS index threshold is the thirteenth threshold. In a possible implementation, the terminal device determines, within a detection time window, that a downlink MCS index and/or an uplink MCS index that are/is used during scheduling in a serving cell on the NR side are/is less than the preset MCS index threshold. In another possible implementation, the terminal device determines, through counting within a detection time window, that a proportion of downlink MCS indexes and/or uplink MCS indexes that are used during scheduling in a serving cell on the NR side and that are less than a preset MCS index counting threshold exceeds a specified percentage such as 80%. In this case, the terminal device determines that the downlink MCS index and/or the uplink MCS index on the NR side are/is less than the preset MCS index threshold. The preset MCS index threshold or the preset MCS index counting threshold may be a threshold that is set inside the terminal device. For example, the threshold is a fixed value that is set inside the terminal device, or is a value dynamically set by the terminal device. For example, the terminal device dynamically sets the preset MCS index threshold or the preset MCS index counting threshold based on one or a combination of power consumption information, air interface environment information (for example, interference of a current environment, or signal quality of the serving cell), signal quality information (for example, RSRP, RSRQ, or an SINR of the neighboring cell) of the neighboring cell, configuration information (for example, a measurement report triggering threshold that is set in the serving cell) of the serving cell, and the like. In addition, in some other embodiments, the thirteenth threshold may be configured by a base station, or the thirteenth threshold varies with a communication environment. This is not limited in this embodiment of this application.

An example in which the cell in the SCG is a serving cell and the thirteenth threshold is 3 is used. If the terminal device determines that the MCS index corresponding to the serving cell is less than 3, the terminal device considers that the link quality on the SCG side is poor.

A person skilled in the art may understand that when the downlink MCS index and/or the uplink MCS index that are/is used during scheduling in the cell in the SCG are/is relatively small, it may reflect that a link throughput may be relatively low or a bit error rate on a link in the cell is relatively high in case of a relatively large MCS, in other words, the link quality on the NR side is relatively poor.

Manner 14: The first preset condition includes the fourteenth threshold, and the terminal device determines that the block error rate BLER in sending downlink data and/or receiving uplink data in the cell in the SCG is greater than the fourteenth threshold. The cell in the SCG may be a serving cell or a non-serving cell in the SCG.

For example, the terminal device determines that a downlink block error rate (block error rate, BLER) and/or an uplink BLER are/is greater than a preset BLER threshold, and the preset BLER threshold is the fourteenth threshold. The BLER may be an initial block error rate (Initial block error rate, IBLER) or a residual block error rate (residual block error rate, RBLER), and may be a result obtained by performing counting on a physical downlink shared channel (Physical downlink shared channel, PDSCH)/a physical uplink shared channel (physical uplink shared channel, PUSCH), or may be a result obtained by performing counting on a physical downlink control channel (physical downlink control channel, PDCCH)/a physical uplink control channel (physical uplink control channel, PUCCH), or may be a result obtained by performing counting on a reference signal such as an SSB/a CSI-RS/a sounding reference signal (sounding reference signal, SRS). For example, the terminal device counts, within a detection time window, a downlink data transmission IBLER existing during scheduling in a serving cell on the NR side, and compares the downlink data transmission IBLER with a preset downlink IBLER threshold. The preset BLER threshold may be a threshold that is set inside the terminal device. For example, the threshold is a fixed value that is set inside the terminal device, or is a value dynamically set by the terminal device. For example, the terminal device dynamically sets the preset BLER threshold based on one or a combination of power consumption information, air interface environment information (for example, interference of a current environment or signal quality of the serving cell), signal quality information (for example, RSRP, RSRQ, or an SINR of the neighboring cell) of the neighboring cell, configuration information (for example, a measurement report triggering threshold that is set in the serving cell) of the serving cell, and the like. A person skilled in the art may understand that when the downlink BLER and/or the uplink BLER in the serving cell on the NR side are/is relatively low, it may reflect that a bit error rate on a link is relatively high, in other words, the link quality on the NR side is relatively poor. In addition, in some other embodiments, the fourteenth threshold may be configured by a base station, or the fourteenth threshold varies with a communication environment. This is not limited in this embodiment of this application.

An example in which the cell in the SCG is a serving cell and the fourteenth threshold is 15% is used. If the terminal device determines that the block error rate in sending downlink data in the serving cell is greater than 15%, the terminal device considers that the link quality on the SCG side is poor.

It should be noted that, in an aspect, only a manner in which the terminal device determines, through single detection, that the link quality on the NR side is relatively poor is described by using an example in the foregoing manners. In an actual implementation process, the terminal device may implement the foregoing manners for a plurality of times. In the foregoing manners, only after a quantity of times of detecting that the link quality on the NR side is relatively poor reaches a specified quantity of times, the terminal device finally determines that the link quality on the NR side is relatively poor, and performs subsequent steps. In another aspect, only some determining manners are enumerated above, and the terminal device may determine, in another determining manner, that the link quality on the NR side is relatively poor. In still another aspect, the terminal device may specifically combine one or more of the foregoing manners in a plurality of specific combination manners. For example, different combination manners are used in different scenarios. This is not limited in the present invention.

A person skilled in the art may understand that after determining that the link quality on the NR side is relatively poor, the terminal device may consider that the cell in the SCG is a problematic cell, to perform targeted optimization.

202. The terminal device obtains link quality information of a neighboring cell, where the neighboring cell and the serving cell may be intra-frequency cells and/or inter-frequency cells.

For example, the link quality information may be one or more of RSRP, RSRQ, an SINR, load (load), a priority, availability, or the like. The RSRP may be cell-level, user-level, or beam-level RSRP. The RSRQ may be cell-level or user-level RSRQ. The load may be one or more of various resource-limited indications and the following cell-based information: traffic, a throughput, service dynamic information, a user quantity, a cell capability, a congestion degree, high power, a call drop rate, an average scheduling rate, physical resource block (physical resource block, PRB) utilization, a guaranteed bit rate (guaranteed bit rate, GBR), or a quality of service (quality of service, QoS) satisfaction rate. The priority may be a frequency priority, a frequency band priority, a handover priority, or the like. The availability may be understood as access barred (barred) indication information and supported service information of the neighboring cell. The terminal device may obtain load information of the neighboring cell by receiving indication information added by the network side into a related message. The indication information may be an explicit indication or an implicit indication. For example, the terminal device maps or calculates the load information of the neighboring cell by using the indication information carried in the related message. Alternatively, the terminal device determines load information by detecting an air interface message exchanged in the neighboring cell. For example, the terminal device determines load of the neighboring cell by detecting a downlink data message sent in the neighboring cell within a specific time period. Alternatively, the terminal device obtains load information by using a cloud. For example, the terminal device receives a packet that is delivered by a server and that records current load information of the neighboring cell on the NR side, and obtains the load of the neighboring cell from the packet. A specific obtaining manner used by the terminal device is not limited in the present invention.

A person skilled in the art may understand that, after receiving an SgNB addition request (Addition Request) message, the SgNB may usually generate measurement control information, and send the measurement control information to the terminal device by using the MeNB. The measurement control information includes a measurement object (which is an attribute such as a measurement system that is an NR system herein, a measurement frequency, or a measurement cell, and is used to indicate a frequency or a cell, namely, a neighboring cell, on which the terminal device needs to perform signal quality measurement), report configuration (which is, for example, measurement event information, a triggering quantity and a reporting quantity during intra-system handover, and other information of a measurement report, and is used to indicate a criterion used by the terminal device to report the measurement report) of a measurement task, and other configuration (such as a measurement quantity, a measurement gap, and measurement filtering) of the measurement task. Therefore, the terminal device determines, based on an indication in the measurement control information and a policy of the terminal device, a neighboring cell for performing measurement, and obtains related link quality information of the neighboring cell. The measurement frequency or the measurement cell may be an intra-frequency neighboring cell or an inter-frequency neighboring cell. It should be noted that when the neighboring cell is an inter-frequency neighboring cell of the serving cell, it is possible that the network side initially delivers only A2 measurement control information, and delivers measurement control information of the inter-frequency neighboring cell only when the terminal device side reports an A2 measurement report. Therefore, if the network side does not deliver the measurement control information of the inter-frequency neighboring cell before step 202, after the condition in step 201 is met, the terminal device may report the A2 measurement report to the network side, to trigger the network side to deliver the measurement control information of the inter-frequency neighboring cell. For example, the terminal device fills, into the A2 measurement report, RSRP of the current serving cell or a corresponding RSRP value that can be sufficient to trigger the network side to deliver the measurement control information of the inter-frequency neighboring cell. After receiving the measurement control information of the NR inter-frequency neighboring cell, the terminal device determines, based on the indication in the measurement control information and the policy of the terminal device, the inter-frequency neighboring cell for performing measurement, and obtains the link quality information of the neighboring cell. When S-measure (S-measure) is configured on the network side, if the terminal device obtains the link quality information of the serving cell in the SCG by using step 201 and finds that the link quality information of the serving cell meets the first preset condition, in other words, when the terminal device determines that the link quality of the serving cell on the NR side is relatively poor, if RSRP of the serving cell is greater than an RSRP threshold indicated in the S-measure, the terminal device still performs related NR intra-frequency neighboring cell and inter-frequency neighboring cell measurement. The S-measure is a field in measurement configuration (measConfig) in LTE or NR, and the measConfig information element is an information element in RRC reconfiguration (RRC Reconfiguration) signaling sent by the network side.

It should be noted that the terminal device may obtain quality information of a plurality of neighboring cells. This is specifically determined based on the measurement control information configured on the network side and the internal policy of the terminal device.

203. If there is no better neighboring cell in the at least one neighboring cell, generate a first message, where the better neighboring cell is a neighboring cell whose link quality information meets a second preset condition in the at least one neighboring cell.

For example, the link quality information of the neighboring cell includes at least one of reference signal received power RSRP, reference signal received quality RSRQ, a signal to interference plus noise ratio SINR, load, a priority, or availability. Correspondingly, a method in which the terminal device determines whether there is a better neighboring cell may be as follows: The terminal device determines whether there is a neighboring cell whose link quality information meets one or a combination of the following determining cases in the at least one neighboring cell; and if yes, the terminal device determines that there is a better neighboring cell; otherwise, the terminal device considers that there is a better neighboring cell. For a manner in which the terminal device obtains the RSRP, the RSRQ, the SINR, and the like, refer to 3GPP TS38.215, 3GPP TS36.214, and the like. For a manner in which the terminal device obtains the priority, the load, the availability, and the like, refer to 3GPP TS 36.311, 3GPP TS 36.304, and the like.

The cases are separately described in detail below.

Case 1: The second preset condition includes a first condition. The terminal device determines, based on the link quality information of the at least one neighboring cell, whether there is a cell whose reference signal received power RSRP meets the first condition in the at least one neighboring cell.

For example, the RSRP of the neighboring cell meets an RSRP fulfillment condition, and the fulfillment condition is the first condition.

For example, during application to an A3 measurement report, when the neighboring cell meets, within a time period (for example, time to trigger), Mn+a first compensated RSRP value+Ofn+Ocn−Hys>Mp+Ofp Ocp+Off, it indicates that the RSRP of the neighboring cell meets the RSRP fulfillment condition. Mn is the RSRP of the neighboring cell, Mp is the RSRP of the serving cell, the first compensated RSRP value is a preset value or a dynamic value, for example, 5 dBm, Ofn represents a frequency offset of the neighboring cell, Ocn represents a cell offset of the neighboring cell, Hys represents an amplitude hysteresis of a measurement structure, Ofp represents a frequency offset of the serving cell, Ocp represents a cell offset of the serving cell, and off represents an offset of a measurement result.

For another example, during application to an A4 measurement report, when the neighboring cell meets, within a time period (for example, time to trigger (Time To Trigger)), Mn+a second compensated RSRP value+Ofn+Ocn−

Hys>Thresh, it indicates that the RSRP of the neighboring cell meets the RSRP fulfillment condition Thresh. Thresh is a threshold configured on the network side, Mn is the RSRP of the neighboring cell, Ofn represents a frequency offset of the neighboring cell, Ocn represents a cell offset of the neighboring cell, Hys represents an amplitude hysteresis of a measurement structure, and Thresh represents a fulfillment condition that is met by the RSTP.

For another example, during application to an A5 measurement report, when the neighboring cell meets, within a time period (for example, time to trigger), Mn+a third compensated RSRP value+Ofn+Ocn−Hys>Thresh2, it indicates that the RSRP of the neighboring cell meets the RSRP fulfillment condition. Mn is the RSRP of the neighboring cell, Thresh2 is an RSRP threshold configured on the network side, the third compensated RSRP value is a preset value or a dynamic value, for example, 5 dBm, Ofn represents a frequency offset of the neighboring cell, Ocn represents a cell offset of the neighboring cell, Hys represents an amplitude hysteresis of a measurement structure, and Thresh represents a fulfillment condition that is met by the RSTP. It should be noted that, in this case, the terminal device considers, based on the determining in step 201, that the RSRP value of the serving cell meets an A5 triggering threshold.

For another example, during application to an A3 measurement report, when the RSRP of the neighboring cell meets, within a time period of time to trigger—ΔT1, Mn+Ofn+Ocn−Hys>Mp+Ofp+Ocp+Off, it indicates that the RSRP of the neighboring cell meets the RSRP fulfillment condition. ΔT1 is a time difference, may be a preset fixed value or correspondingly set based on a value of the time to trigger, and indicates that the terminal device side performs measurement determining by using a shorter time hysteresis.

For another example, during application to an A4 measurement report, when the RSRP of the neighboring cell meets, within a time period of time to trigger—ΔT2, Mn+Ofn+Ocn−Hys>Thresh, it indicates that the RSRP of the neighboring cell meets the RSRP fulfillment condition. ΔT2 is a time difference, may be a preset fixed value or correspondingly set based on a value of the time to trigger, and indicates that the terminal device side performs measurement determining by using a shorter time hysteresis.

For another example, during application to an A5 measurement report, when the RSRP of the neighboring cell meets, within a time period of time to trigger—ΔT3, Mn+Ofn+Ocn−Hys>Thresh2, it indicates that the RSRP of the neighboring cell meets the RSRP fulfillment condition. ΔT3 is a time difference, may be a preset fixed value or correspondingly set based on a value of the time to trigger, and indicates that the terminal device side performs measurement determining by using a shorter time hysteresis. It should be noted that, in this case, the terminal device considers, based on the determining in step 201, that the RSRP value of the serving cell meets an A5 triggering threshold. It should be noted that the terminal device may se another RSRP fulfillment condition. This is not limited in the present invention.

Case 2: The second preset condition includes a second condition. The terminal device determines, based on the link quality information of the at least one neighboring cell, whether there is a cell whose reference signal received quality RSRQ meets the second condition in the at least one neighboring cell.

For example, the RSRQ of the neighboring cell meets an RSRQ fulfillment condition, and the fulfillment condition is the second condition.

For example, during application to an A3 measurement report, when the neighboring cell meets, within a time period (for example, time to trigger), Mn+a first compensated RSRQ value+Ofn+Ocn−Hys>Mp+Ofp+Ocp+Off, it indicates that the RSRQ of the neighboring cell meets the RSRQ fulfillment condition. Mn is the RSRQ of the neighboring cell, Mp is RSRQ of the serving cell, the first compensated RSRQ value is a preset value or a dynamic value, for example, 5 dBm, Ofn represents a frequency offset of the neighboring cell, Ocn represents a cell offset of the neighboring cell, Hys represents an amplitude hysteresis of a measurement structure, Ofp represents a frequency offset of the serving cell, Ocp represents a cell offset of the serving cell, and off represents an offset of a measurement result.

For another example, during application to an A4 measurement report, when the neighboring cell meets, within a time period (for example, time to trigger), Mn+a second compensated RSRQ value+Ofn+Ocn−Hys>Thresh, it indicates that the RSRQ of the neighboring cell meets the RSRQ fulfillment condition Thresh. Thresh is a threshold configured on the network side, Mn is RSRQ of the neighboring cell, Ofn represents a frequency offset of the neighboring cell, Ocn represents a cell offset of the neighboring cell, Hys represents an amplitude hysteresis of a measurement structure, Thresh represents a fulfillment condition that is met by the RSTP.

For another example, during application to an A5 measurement report, when the neighboring cell meets, within a time period (for example, time to trigger), Mn+a third compensated RSRQ value+Ofn+Ocn−Hys>Thresh2, it indicates that the RSRQ of the neighboring cell meets the RSRQ fulfillment condition. Mn is the RSRQ of the neighboring cell, Thresh2 is an RSRQ threshold configured on the network side, the third compensated RSRQ value is a preset value or a dynamic value, for example, 5 dBm, Ofn represents a frequency offset of the neighboring cell, Ocn represents a cell offset of the neighboring cell, Hys represents an amplitude hysteresis of a measurement structure, and Thresh represents a fulfillment condition that is met by the RSTP. It should be noted that, in this case, the terminal device considers, based on the determining in step 201, that an RSRQ value of the serving cell meets an A5 triggering threshold.

For another example, during application to an A3 measurement report, when the RSRQ of the neighboring cell meets, within a time period of time to trigger—ΔT1, Mn+Ofn+Ocn−Hys>Mp+Ofp+Ocp+Off, it indicates that the RSRQ of the neighboring cell meets the RSRQ fulfillment condition. ΔT1 is a time difference, may be a preset fixed value or correspondingly set based on a value of the time to trigger, and indicates that the terminal device side performs measurement determining by using a shorter time hysteresis.

For another example, during application to an A4 measurement report, when the RSRQ of the neighboring cell meets, within a time period of time to trigger—ΔT2, Mn+Ofn+Ocn−Hys>Thresh, it indicates that the RSRQ of the neighboring cell meets the RSRQ fulfillment condition. ΔT2 is a time difference, may be a preset fixed value or correspondingly set based on a value of the time to trigger, and indicates that the terminal device side performs measurement determining by using a shorter time hysteresis.

For another example, during application to an A5 measurement report, when the RSRQ of the neighboring cell meets, within a time period of time to trigger—ΔT3, Mn+Ofn+Ocn−Hys>Thresh2, it indicates that the RSRQ of the neighboring cell meets the RSRQ fulfillment condition. ΔT3 is a time difference, may be a preset fixed value or correspondingly set based on a value of the time to trigger, and indicates that the terminal device side performs measurement determining by using a shorter time hysteresis. It should be noted that, in this case, the terminal device considers, based on the determining in step 201, that an RSRQ value of the serving cell meets an A5 triggering threshold. It should be noted that the terminal device may set another RSRQ fulfillment condition. This is not limited in the present invention.

Case 3: The second preset condition includes a third condition. The terminal device determines, based on the link quality information of the at least one neighboring cell, whether there is a cell whose signal to interference plus noise ratio SINR meets the third condition in the at least one neighboring cell.

For example, the SINR of the neighboring cell meets an SINR fulfillment condition, and the fulfillment condition is the second condition.

For example, during application to an A3 measurement report, when the neighboring cell meets, within a time period (for example, time to trigger), Mn+a first compensated SINR value+Ofn+Ocn−Hys>Mp+Ofp+Ocp+Off, it indicates that the SINR of the neighboring cell meets the SINR fulfillment condition. Mn is the SINR of the neighboring cell, Mp is an SINR of the serving cell, the first compensated SINR value is a preset value or a dynamic value, for example, 5 dBm, Ofn represents a frequency offset of the neighboring cell, Ocn represents a cell offset of the neighboring cell, Hys represents an amplitude hysteresis of a measurement structure, Ofp represents a frequency offset of the serving cell, Ocp represents a cell offset of the serving cell, and off represents an offset of a measurement result.

For another example, during application to an A4 measurement report, when the neighboring cell meets, within a time period (for example, time to trigger), Mn+a second compensated SINR value+Ofn+Ocn−Hys>Thresh, it indicates that the SINR of the neighboring cell meets the SINR fulfillment condition Thresh. Thresh is a threshold configured on the network side, Mn is the SINR of the neighboring cell, Ofn represents a frequency offset of the neighboring cell. Ocn represents a cell offset of the neighboring cell, Hys represents an amplitude hysteresis of a measurement structure, Thresh represents a fulfillment condition that is met by the RSTP.

For another example, during application to an A5 measurement report, when the neighboring cell meets, within a time period (for example, time to trigger), Mn+a third compensated SINR value+Ofn+Ocn−Hys>Thresh2, it indicates that the SINR of the neighboring cell meets the SINR fulfillment condition. Mn is the SINR of the neighboring cell, Thresh2 is an SINR threshold configured on the network side, the third compensated SINR value is a preset value or a dynamic value, for example, 5 dBm, Ofn represents a frequency offset of the neighboring cell, Ocn represents a cell offset of the neighboring cell, Hys represents an amplitude hysteresis of a measurement structure, and Thresh represents a fulfillment condition that is met by the RSTP. It should be noted that, in this case, the terminal device considers, based on the determining in step 201, that an SINR value of the serving cell meets an A5 triggering threshold.

For another example, during application to an A3 measurement report, when the SINR of the neighboring cell meets, within a time period of time to trigger—ΔT1, Mn+Ofn+Ocn−Hys>Mp+Ofp+Ocp+Off, it indicates that the SINR of the neighboring cell meets the SINR fulfillment condition. ΔT1 is a time difference, may be a preset fixed value or correspondingly set based on a value of the time to trigger, and indicates that the terminal device side performs measurement determining by using a shorter time hysteresis.

For another example, during application to an A4 measurement report, when the SINR of the neighboring cell meets, within a time period of time to trigger—ΔT2, Mn+Ofn+Ocn−Hys>Thresh, it indicates that the SINR of the neighboring cell meets the SINR fulfillment condition. ΔT2 is a time difference, may be a preset fixed value or correspondingly set based on a value of the time to trigger, and indicates that the terminal device side performs measurement determining by using a shorter time hysteresis.

For another example, during application to an A5 measurement report, when the SINR of the neighboring cell meets, within a time period of time to trigger—ΔT3, Mn+Ofn+Ocn−Hys>Thresh2, it indicates that the SINR of the neighboring cell meets the SINR fulfillment condition. ΔT3 is a time difference, may be a preset fixed value or correspondingly set based on a value of the time to trigger, and indicates that the terminal device side performs measurement determining by using a shorter time hysteresis. It should be noted that, in this case, the terminal device considers, based on the determining in step 201, that an SINR value of the serving cell meets an A5 triggering threshold. It should be noted that the terminal device may set another SINR fulfillment condition. This is not limited in the present invention.

Case 4: The second preset condition includes a fourth condition. The terminal device determines, based on the link quality information of the at least one neighboring cell, whether there is a cell whose load meets the fourth condition in the at least one neighboring cell.

For example, the load of the neighboring cell meets a load fulfillment condition, and the load fulfillment condition is the fourth condition. For example, traffic of the neighboring cell is less than a preset traffic threshold, a downlink throughput and/or an uplink throughput of the neighboring cell are/is less than a threshold, a downlink throughput and/or an uplink throughput of one or some types of services of the neighboring cell are/is less than a threshold, a user quantity of the neighboring cell is less than a user quantity threshold, a cell capability is greater than a threshold, a congestion degree is less than a threshold, total transmit power of a base station in the neighboring cell is less than a threshold, a call drop rate of the neighboring cell is less than a threshold, an average scheduling rate of the terminal device in the neighboring cell is greater than a threshold, a PRB utilization rate of the neighboring cell is less than a threshold, or a guaranteed bit rate or a quality of service (quality of service, QoS) satisfaction rate of the neighboring cell is greater than a threshold. Alternatively, one or more of the foregoing plurality of cases are combined to determine whether the load fulfillment condition is met.

Case 5: The second preset condition includes a fifth condition. The terminal device determines, based on the link quality information of the at least one neighboring cell, whether there is a cell whose priority meets the fifth condition in the at least one neighboring cell.

For example, the priority of the neighboring cell meets a priority fulfillment condition, and the priority fulfillment condition is the fifth condition. For example, the priority of the neighboring cell meets a priority that is set by the terminal device and that is of a neighboring cell to which the terminal device can be handed over. The priority that is set by the terminal device and that is of the neighboring cell to which the terminal device can be handed over may be indicated by the network side to the terminal device by using dedicated signaling, may be preset inside the terminal device, or may be dynamically set by the terminal device based on a current transmission status, the RSRP of the neighboring cell, power consumption information, and the like. This is not limited in the present invention.

Case 6: The second preset condition includes a sixth condition. The terminal device determines, based on the link quality information of the at least one neighboring cell, whether there is a cell whose availability meets the sixth condition in the at least one neighboring cell.

For example, the availability of the neighboring cell meets an availability fulfillment condition, and the availability fulfillment condition is the sixth condition. For example, access barred indication information of the neighboring cell indicates that the neighboring cell is not an access barred neighboring cell, or supported service information of the neighboring cell indicates that the neighboring cell supports a related service of the terminal device.

When determining, based on the link quality information of the at least one neighboring cell, whether there is a better neighboring cell, the terminal device determines, based on the link quality information of the at least one neighboring cell, whether there is a neighboring cell that meets one or more of the first condition, the second condition, the third condition, the fourth condition, the fifth condition, or the sixth condition in the at least one neighboring cell. If there is a neighboring cell that meets one or more of the first condition, the second condition, the third condition, the fourth condition, the fifth condition, or the sixth condition in the at least one neighboring cell, the terminal device uses the neighboring cell as the better neighboring cell. Otherwise, the terminal device determines that there is no better neighboring cell.

Step 204: The terminal device sends the first message to the MeNB.

For example, the first message may be an A2 measurement report, SCG failure information (SCG failure information), or SCG failure information NR (SCG failure information NR). The terminal device may fill determined original link quality information of the serving cell into the A2 measurement report or the like, and send the A2 measurement report to the master base station. Alternatively, the terminal device may perform specified processing on original link quality information of the serving cell, fill the processed link quality information of the serving cell into the A2 measurement report or the like, and send the A2 measurement report to the master base station. Processing means performing an operation on the link quality information of the serving cell. After receiving the A2 measurement report, the master base station determines whether to release the SCG. If the master base station releases the SCG, the master base station sends a release message to the terminal device. The release message is used to indicate the terminal device to release the SCG. After receiving the release message, the terminal device releases the SCG. If the master base station determines not to release the SCG, the master base station indicates a split point to allocate less uplink and downlink data to a branch on which the secondary base station performs split in case of a split bearer.

Step 205: The terminal device sends a second message to the MeNB.

For example, the second message may be an A3 measurement report, an A4 measurement report, or an A5 measurement report. The terminal device may fill determined original link quality information of the better neighboring cell into the A5 measurement report, the A4 measurement report, the A5 measurement report, or the like, and send the A3 measurement report, the A4 measurement report, or the A5 measurement report to the master base station. Alternatively, the terminal device may perform specified processing on original link quality information of the better neighboring cell, fill the processed link quality information of the better neighboring cell into the A3 measurement report, the A4 measurement report, the A5 measurement report, or the like, and send the A5 measurement report, the A4 measurement report, or the A5 measurement report to the master base station. Alternatively, the terminal device determines a preset value, and uses the value as the link quality information of the better neighboring cell. Processing means performing an operation on the link quality information of the better neighboring cell. After receiving the A3 measurement report, the A4 measurement report, or the A5 measurement report, the master base station determines whether to trigger the terminal device to perform cell handover. If the master base station determines to trigger the terminal device to perform cell handover, the master base station sends a handover message to the terminal device, so that the terminal device is handed over from the serving cell to the better neighboring cell. If the master base station does not trigger cell handover, the master base station indicates a split point to allocate less uplink and downlink data to a branch on which the secondary base station performs split in case of a split bearer.

A person skilled in the art may understand that, when the terminal device side does not obtain, through measurement, a neighboring cell that meets an A3/A4/A5 measurement report reporting threshold on the network side, if the terminal device determines that there is a neighboring cell with better quality, the terminal device actively sends the A3/A4/A5 measurement report to trigger the network side to send handover indication information to the terminal device to indicate the terminal device to hand over to an NR neighboring cell in which the terminal device performs reporting. Therefore, the following case is avoided to a degree: Transmission quality on the NR side is poor within a long time period because the measurement report threshold is improperly configured on the network side, and quality of service of the terminal device is improved. Therefore, in the foregoing process, the terminal device may actively trigger the network side to indicate the terminal device to hand over to the NR neighboring cell.

On the contrary, if the terminal device determines that there is no better neighboring cell, the terminal device sends the A2 measurement report or the SCG failure information/SCG failure information NR message to the network side. If the terminal device sends the A2 measurement report, the terminal device adds the RSRP of the serving cell into the A2 measurement report, or adds a preset RSRP value into the A2 measurement report, in other words, the terminal device uses the preset RSRP as the RSRP of the serving cell. The preset RSRP may be any value that meets an A2 measurement report triggering threshold configured on the network side, any value that meets an A2 measurement report triggering threshold that is configured on the network side and a threshold for triggering the network side to release the SCG, or a difference obtained by subtracting a preset value from the RSRP of the serving cell. A person skilled in the art may understand that, when detecting that the RSRP of the serving cell fails to meet the threshold for triggering A2 measurement report reporting, the terminal device actively sends the A2 measurement report to trigger the network side to indicate the terminal device to release the SCG. This reduces power consumption on the terminal device side. If the terminal device sends the SCG failure information/SCG failure information NR message, the terminal device adds a failure type (Failure Type) field into the SCG failure information/SCG failure information NR message, and indicates that the failure type is timer T313 expiry (t313-expiry) or a maximum quantity of RLC retransmission times (rlc-Max Num Retx). A person skilled in the art may understand that "the failure type is t313-expiry or rlc-Max NUM Retxs" may indicate to the network side that the link quality of the current serving cell of the terminal device is relatively poor. A person skilled in the art may understand that when the terminal device reports the SCG failure information/SCG failure information NR message to the network side and does not add, into the SCG failure information/SCG failure information NR message, information that is of a neighboring cell and that meets a measurement report triggering threshold, the network side may be very likely to trigger the terminal device to release the SCG. This reduces power consumption on the terminal device side.

Therefore, in the foregoing process, the terminal device may actively trigger the network side to indicate the terminal device to release the SCG. A manner in which the terminal device specifically sends the first message and an indication manner in which the network side indicates the terminal device to release the SCG are not limited in this embodiment of this application.

It should be noted that, in an aspect, the foregoing describes, only by using some examples, the manner of determining whether there is a better neighboring cell based on the link quality information of the neighboring cell. In addition, the terminal device may use another determining manner based on the link quality information of the neighboring cell. This is not limited in the present invention. In another aspect, the terminal device may combine one or more determining cases based on the internal policy, and a specific combination manner is not limited.

For example, the terminal device uses, as the better neighboring cell, a neighboring cell with largest RSRP in non-access barred intra-frequency neighboring cells. Therefore, the terminal device sends an A3 report to the network side, and adds the RSRP of the neighboring cell into the report, or adds a preset RSRP value into the report, in other words, the terminal device uses the preset RSRP as the RSRP of the neighboring cell. The preset RSRP may be any value that meets an A3 report triggering threshold configured on the network side, or may be a sum obtained by adding the RSRP of the neighboring cell and a preset difference. Alternatively, the terminal device determines a neighboring cell with largest RSRP in non-access barred intra-frequency neighboring cells, and determines that the RSRP of the neighboring cell meets an RSRP threshold that is set inside the terminal device. In this case, the terminal device determines that the neighboring cell is a connectable neighboring cell. Therefore, the terminal device sends an A3/A4/A5 measurement report to the network side, and adds the RSRP of the neighboring cell into the report, or adds a preset RSRP value into the report, in other words, the terminal device uses the preset RSRP as the RSRP of the neighboring cell. The preset RSRP may be any value that meets an A3/A4/A5 measurement report triggering threshold configured on the network side, or may be a sum obtained by adding the RSRP of the neighboring cell and a preset value.

In the SCG-side service processing method in a dual connectivity scenario provided in this embodiment of this application, in the EN-DC scenario, when the transmission quality on the NR side decreases, the terminal device obtains the link quality information of the at least one neighboring cell of the serving cell by determining that the link quality of the serving cell in the SCG is poor, and determines whether there is a better neighboring cell. When there is no better neighboring cell, the terminal device can promptly send, to the master base station, the link quality information determined based on the link quality information of the serving cell, so that the master base station promptly determines whether to release the SCG and the like. This prevents the terminal device from continuing to transmit uplink and downlink data based on the serving cell. When there is a better neighboring cell, the terminal device can promptly send the determined link quality information of the better neighboring cell to the master base station, so that the master base station promptly determines whether to trigger the terminal device to perform cell handover. This prevents the terminal device from continuing to transmit uplink and downlink data based on the serving cell.

Next, the dual connectivity architecture is an NGEN-DC architecture.

Referring to FIG. 7 and FIG. 8, in the NGEN-DC architecture, a terminal device is connected to an eLTE-eNB and a gNB. The eLTE-eNB is a master base station, and the gNB is a secondary base station. The eLTE-eNB is connected to an NGC, and the eLTE-eNB is connected to the gNB through an Xn interface.

Figure 14:
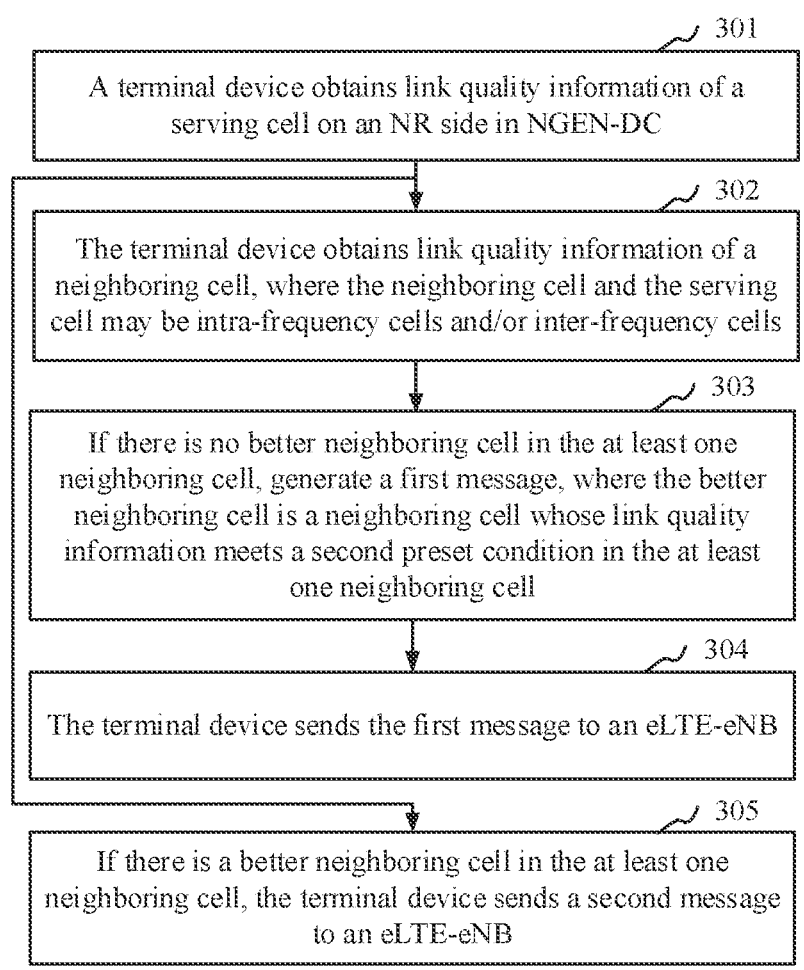
FIG. 14 is a flowchart of still another SCG-side service processing method in a dual connectivity scenario according to an embodiment of this application.

FIG. 14 is a flowchart of still another SCG-side service processing method in a dual connectivity scenario according to an embodiment of this application. This embodiment is described in detail from a perspective of a terminal device. This embodiment includes the following steps.

301. The terminal device obtains link quality information of a serving cell on an NR side in NGEN-DC.

For example, if link quality on the NR side is poor, it indicates that quality of the serving cell in an SCG is poor. The terminal device obtains the link quality information of the serving cell on the NR side. When the link quality information of the serving cell meets a first preset condition, for example, when air interface signal quality on the NR side is relatively poor, out-of-synchronization frequently occurs on the NR side, scheduling on the NR side is less, and a bit error rate on the NR side is relatively high, the terminal device determines that the link quality on the NR side is poor.

Specifically, the terminal device may determine, based on the manner in step 201, that the link quality on the NR side is poor. For specific descriptions, refer to step 201. Details are not described herein again.

302. The terminal device obtains link quality information of a neighboring cell, where the neighboring cell and the serving cell may be intra-frequency cells and/or inter-frequency cells.

For details, refer to the descriptions in step 202. Details are not described herein again.

303. If there is no better neighboring cell in the at least one neighboring cell, generate a first message, where the better neighboring cell is a neighboring cell whose link quality information meets a second preset condition in the at least one neighboring cell.

For example, the link quality information of the neighboring cell includes at least one of reference signal received power RSRP, reference signal received quality RSRQ, a signal to interference plus noise ratio SINR, load, a priority, or availability. Correspondingly, a method in which the terminal device determines whether there is a better neighboring cell may be as follows: The terminal device determines whether there is a neighboring cell in the at least one neighboring cell, where one or more of RSRP, RSRQ, an SINR, load, a priority, or availability of the neighboring cell meets the second preset condition. If there is a neighboring cell in the at least one neighboring cell, where one or more of RSRP, RSRQ, an SINR, load, a priority, or availability of the neighboring cell meets the second preset condition, the terminal device uses the neighboring cell that meets the second preset condition as the better neighboring cell. If there is no neighboring cell in the at least one neighboring cell, where one or more of RSRP, RSRQ, an SINR, load, a priority, or availability of the neighboring cell meets the second preset condition, the terminal device considers that there is no better neighboring cell.

Step 304: The terminal device sends the first message to the eLTE-eNB.

For example, the first message may be an A2 measurement report, SCG failure information, or SCG failure information NR. For example, when coverage of the gNB is discontinuous and the like, a service data amount of the terminal device is relatively large, or a split bearer or an SCG bearer is used, the terminal device fills determined original link quality information of the serving cell into the A2 measurement report or the like, and sends the A2 measurement report to the master base station. Alternatively, the terminal device may perform specified processing on original link quality information of the serving cell, fill the processed link quality information of the serving cell into the A2 measurement report or the like, and send the A2 measurement report to the master base station. Processing means performing an operation on the link quality information of the serving cell. After receiving the A2 measurement report, the master base station determines whether to release the SCG. If the master base station releases the SCG, the master base station sends a release message to the terminal device. The release message is used to indicate the terminal device to release the SCG. After receiving the release message, the terminal device releases the SCG. If the master base station determines not to release the SCG, the master base station indicates a split point to allocate less uplink and downlink data to a branch on which the secondary base station performs split in case of a split bearer.

Step 305: If there is a better neighboring cell in the at least one neighboring cell, the terminal device sends a second message to the eLTE-eNB.

For example, the second message may be an A3 measurement report, an A4 measurement report, or an A5 measurement report. The terminal device may fill original link quality information of the better neighboring cell into the A3 measurement report, the A4 measurement report, the A5 measurement report, or the like, and send the A3 measurement report, the A4 measurement report, or the A5 measurement report to the master base station. Alternatively, the terminal device may perform specified processing on original link quality information of the better neighboring cell, fill the processed link quality information of the better neighboring cell into the A3 measurement report, the A4 measurement report, the A5 measurement report, or the like, and send the A3 measurement report, the A4 measurement report, or the A5 measurement report to the master base station. Alternatively, the terminal device determines a preset value, and uses the value as the link quality information of the better neighboring cell. Processing means performing an operation on the link quality information of the better neighboring cell. After receiving the A3 measurement report, the A4 measurement report, or the A5 measurement report, the master base station determines whether to trigger the terminal device to perform cell handover. If the master base station determines to trigger the terminal device to perform cell handover, the master base station sends a handover message to the terminal device, so that the terminal device is handed over from the serving cell to the better neighboring cell. If the master base station determines not to trigger cell handover, the master base station indicates a split point to allocate less uplink and downlink data to a branch on which the secondary base station performs split in case of a split bearer.

In the SCG-side service processing method in a dual connectivity scenario provided in this embodiment of this application, in the NGEN-DC scenario, when the transmission quality on the SCG side decreases, the terminal device obtains the link quality information of the at least one neighboring cell of the serving cell, and determines whether there is a better neighboring cell. When there is no better neighboring cell, the terminal device can promptly send, to the master base station, the link quality information determined based on the link quality information of the serving cell, so that the master base station promptly determines whether to release the SCG and the like. This prevents the terminal device from continuing to transmit uplink and downlink data based on the serving cell. When there is a better neighboring cell, the terminal device can promptly send the determined link quality information of the better neighboring cell to the master base station, so that the master base station promptly determines whether to trigger the terminal device to perform cell handover. This prevents the terminal device from continuing to transmit uplink and downlink data based on the serving cell.

Finally, the dual connectivity architecture is NE-DC.

In the NE-DC architecture, a terminal device is connected to an ng-eNB and a gNB. The ng-eNB is a secondary base station, and the gNB is a master base station. The gNB is connected to an NGC, and the ng-eNB is connected to the gNB through an Xn interface.

Figure 15:
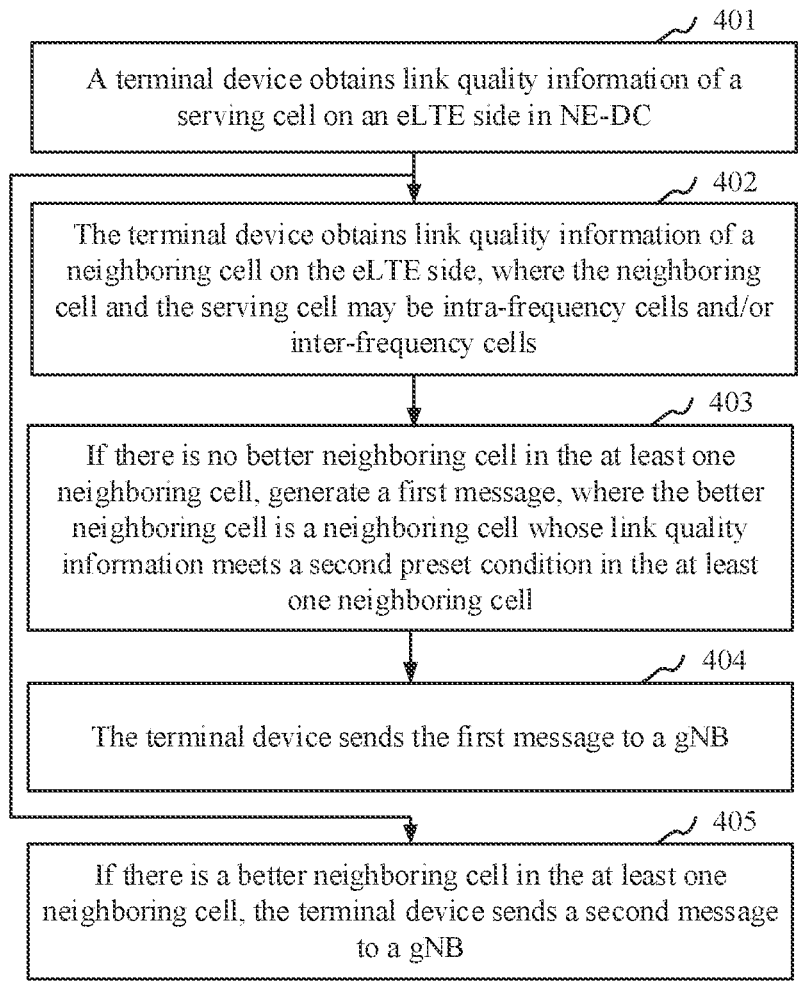
FIG. 15 is a flowchart of still another SCG-side service processing method in a dual connectivity scenario according to an embodiment of this application.

FIG. 15 is a flowchart of still another SCG-side service processing method in a dual connectivity scenario according to an embodiment of this application. This embodiment is described in detail from a perspective of a terminal device. This embodiment includes the following steps.

401. The terminal device obtains link quality information of a serving cell on an eLTE side in NE-DC.

For example, if link quality on the eLTE side is poor, it indicates that quality of a serving cell that provides a service for the terminal device and that is in an SCG is poor. The terminal device obtains the link quality information of the serving cell on the eLTE side. When the link quality information of the serving cell meets a first preset condition, for example, when air interface signal quality on the eLTE side is relatively poor, out-of-synchronization frequently occurs on an NR side, scheduling on the eLTE side is less, and a bit error rate on the eLTE side is relatively high, the terminal device determines that the link quality on the eLTE side is poor.

Specifically, the terminal device may determine, based on the manner in step 201, that the link quality on the eLTE side is poor. For specific descriptions, refer to step 201. Details are not described herein again.

402. The terminal device obtains link quality information of a neighboring cell on the eLTE side, where the neighboring cell and the serving cell may be intra-frequency cells and/or inter-frequency cells.

For details, refer to the descriptions in step 202. Details are not described herein again.

403. If there is no better neighboring cell in the at least one neighboring cell, generate a first message, where the better neighboring cell is a neighboring cell whose link quality information meets a second preset condition in the at least one neighboring cell.

Step 404: The terminal device sends the first message to the gNB.

For example, the first message may be an A2 measurement report, SCG failure information, or SCG failure information NR.

For example, when coverage of the ng-eNB is discontinuous and the like, a service data amount of the terminal device is relatively large, or a split bearer or an SCG bearer is used, the terminal device fills determined original link quality information of the serving cell into the A2 measurement report or the like, and sends the A2 measurement report to the master base station. Alternatively, the terminal device may perform specified processing on original link quality information of the serving cell, fill the processed link quality information of the serving cell into the A2 measurement report or the like, and send the A2 measurement report to the master base station. Processing means performing an operation on the link quality information of the serving cell. After receiving the A2 measurement report, the master base station determines whether to release the SCG. If the master base station releases the SCG, the master base station sends a release message to the terminal device. The release message is used to indicate the terminal device to release the SCG. After receiving the release message, the terminal device releases the SCG. If the master base station determines not to release the SCG, the master base station indicates a split point to allocate less uplink and downlink data to a branch on which the secondary base station performs split in case of a split bearer.

Step 405: If there is a better neighboring cell in the at least one neighboring cell, the terminal device sends a second message to the gNB.

For example, the second message may be an A3 measurement report, an A4 measurement report, or an A5 measurement report. The terminal device may fill original link quality information of the better neighboring cell into the A3 measurement report, the A4 measurement report, the A5 measurement report, or the like, and send the A3 measurement report, the A4 measurement report, or the A5 measurement report to the master base station. Alternatively, the terminal device may perform specified processing on original link quality information of the better neighboring cell, fill the processed link quality information of the better neighboring cell into the A3 measurement report, the A4 measurement report, the A5 measurement report, or the like, and send the A3 measurement report, the A4 measurement report, or the A5 measurement report to the master base station. Alternatively, the terminal device determines a preset value, and uses the value as the link quality information of the better neighboring cell. Processing means performing an operation on the link quality information of the better neighboring cell. After receiving the A3 measurement report, the A4 measurement report, or the A5 measurement report, the master base station determines whether to trigger the terminal device to perform cell handover. If the master base station determines to trigger the terminal device to perform cell handover, the master base station sends a handover message to the terminal device, so that the terminal device is handed over from the serving cell to the better neighboring cell. If the master base station determines not to trigger cell handover, the master base station indicates a split point to allocate less uplink and downlink data to a branch on which the secondary base station performs split in case of a split bearer.

In the SCG-side service processing method in a dual connectivity scenario provided in this embodiment of this application, in the NE-DC scenario, when the transmission quality on the SCG side decreases, the terminal device obtains the link quality information of the at least one neighboring cell of the serving cell, and determines whether there is a better neighboring cell. When there is no better neighboring cell, the terminal device can promptly send, to the master base station, the link quality information determined based on the link quality information of the serving cell, so that the master base station promptly determines whether to release the SCG and the like. This prevents the terminal device from continuing to transmit uplink and downlink data based on the serving cell. When there is a better neighboring cell, the terminal device can promptly send the determined link quality information of the better neighboring cell to the master base station, so that the master base station promptly determines whether to trigger the terminal device to perform cell handover. This prevents the terminal device from continuing to transmit uplink and downlink data based on the serving cell.

Apparatus embodiments of the present invention are provided below, and may be used to perform the method embodiments of the present invention. For details that are not disclosed in the apparatus embodiments of the present invention, refer to the method embodiments of the present invention.

Figure 16:
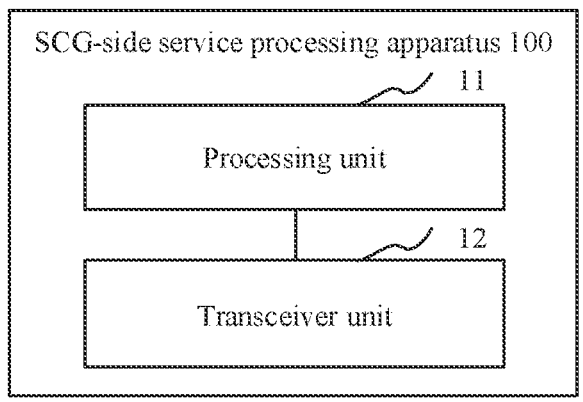
FIG. 16 is a schematic structural diagram of an SCG-side service processing apparatus according to an embodiment of the present invention.

FIG. 16 is a schematic structural diagram of an SCG-side service processing apparatus according to an embodiment of the present invention. The SCG-side service processing apparatus 100 may be implemented by software and/or hardware. As shown in FIG. 10, the SCG-side service processing 100 includes:

a processing unit 11, configured to: obtain link quality information of a serving cell in a secondary cell group SCG; if the link quality information of the serving cell meets a first preset condition, obtain link quality information of at least one neighboring cell of the serving cell; and if there is no better neighboring cell in the at least one neighboring cell, generate a first message, where the better neighboring cell is a neighboring cell whose link quality information meets a second preset condition in the at least one neighboring cell, and the first message carries link quality information determined by the terminal device based on the link quality information of the serving cell; and a transceiver unit 12, configured to send the first message to the master base station, so that the master base station processes a service on the SCG side based on the first message.

In a feasible design, the link quality information of the serving cell includes one or more pieces of the following information: a quantity of starting times of a timer T313 corresponding to a cell in the SCG, running duration of a timer T313 corresponding to a cell in the SCG, a quantity of out-of-synchronization out of sync events in a cell in the SCG, a throughput of data transmitted in a cell in the SCG, a ratio of a throughput of data transmitted in a cell in the SCG to a power consumption amount, a quantity of beam failures triggered in a cell in the SCG, an amount of data buffered at a radio link control RLC layer corresponding to a cell in the SCG, a latency of uplink data sent on a link in a cell in the SCG, a signal strength of a cell in the SCG, a signal strength change amplitude of a cell in the SCG, a retransmission rate of data transmitted on a link in a cell in the SCG, a signal to interference plus noise ratio SINR of a cell in the SCG, a modulation and coding scheme MCS index corresponding to a cell in the SCG, or a block error rate BLER in sending downlink data and/or receiving uplink data in a cell in the SCG.

In a feasible design, the link quality information of the neighboring cell includes at least one of reference signal received power RSRP, reference signal received quality RSRQ, a signal to interference plus noise ratio SINR, load, a priority; or availability.

In a feasible design, the processing unit 11 is further configured to: if there is a better neighboring cell in the at least one neighboring cell, generate a second message. The second message carries link quality information determined by the terminal device based on the link quality information of the better neighboring cell.

The transceiver unit 12 is further configured to send the second message to the master base station.

In a feasible design, the second message is an A3 measurement report, an A4 measurement report, or an A5 measurement report.

In a feasible design, after sending the second message to the master base station, the transceiver unit 12 is further configured to receive a handover message sent by the master base station. The handover message is used to indicate the terminal device to be handed over from the serving cell to the better neighboring cell.

In a feasible design, the first message is an A2 measurement report.

In a feasible design, after sending the first message to the master base station, the transceiver unit 12 is further configured to receive a release message sent by the master base station. The release message is used to indicate the terminal device to release the SCG.

The processing unit 11 is further configured to release the SCG based on the release message.

The SCG-side service processing apparatus provided in this embodiment of the present invention may perform the actions performed by the terminal device in the foregoing embodiments. An implementation principle and a technical effect thereof are similar, and details are not described herein again.

It should be noted that the transceiver unit may be a transceiver in actual implementation, and the processing unit may be implemented in a form of software invoked by using a processing element, or may be implemented in a form of hardware. For example, the processing unit may be an independently disposed processing element, or may be integrated into a chip of the foregoing apparatus for implementation. Alternatively, the processing unit may be stored in a memory of the foregoing apparatus in a form of program code, and invoked by a processing element of the foregoing apparatus to perform a function of the processing unit. In addition, these units may be all or partially integrated, or may be implemented independently. The processing element herein may be an integrated circuit and has a signal processing capability. In an implementation process, steps in the foregoing methods or the foregoing units can be implemented by using a hardware integrated logical circuit in the processing element, or by using instructions in a form of software.

For example, the foregoing units may be one or more integrated circuits configured to implement the foregoing methods, for example, one or more application-specific integrated circuits (application specific integrated circuit, ASIC), one or more microprocessors (digital signal processor, DSP), or one or more field programmable gate arrays (field programmable gate array, FPGA). For another example, when one of the foregoing units is implemented by invoking program code by using a processing element, the processing element may be a general purpose processor, for example, a central processing unit (central processing unit, CPU) or another processor that can invoke the program code. For another example, these units may be integrated together, and implemented in a form of a system-on-a-chip (system-on-a-chip, SOC).

Figure 17:
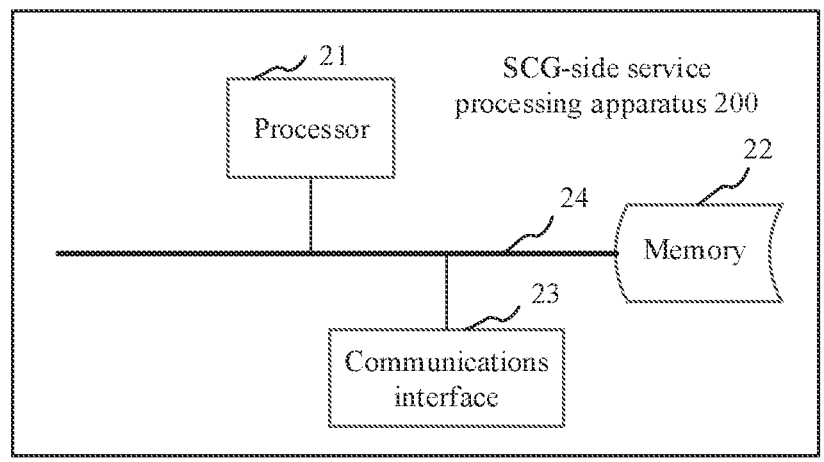
FIG. 17 is a schematic structural diagram of a terminal device according to an embodiment of this application.

FIG. 17 is a schematic structural diagram of a terminal device according to an embodiment of this application. As shown in FIG. 17, the terminal device 200 includes:

a processor 21 and a memory 22.

The memory 22 stores computer execution instructions.

The processor 21 executes the computer execution instructions stored in the memory 22, so that the processor 21 performs the SCG-side service processing method corresponding to the terminal device.

For a specific implementation process of the processor 21, refer to the foregoing method embodiments. An implementation principle and a technical effect thereof are similar. Details are not described again in this embodiment.

Optionally, the terminal device 200 further includes a communications interface 23. The processor 21, the memory 22, and the communications interface 23 may be connected by using a system bus 24.

An embodiment of the present invention further provides a storage medium. The storage medium stores computer execution instructions. When the computer execution instructions are executed by a processor, the SCG-side service processing method performed by the terminal device is implemented.

An embodiment of the present invention further provides a computer program product. When the computer program product is run on a terminal device, the SCG-side service processing method performed by the terminal device is implemented.

In the embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor or any conventional processor or the like. The steps of the methods disclosed with reference to the embodiments of this application may be directly performed by a hardware processor, or may be performed by using a combination of hardware in the processor and a software module.

In the embodiments of this application, the memory may be a non-volatile memory such as a hard disk drive (hard disk drive, HDD) or a solid-state drive (solid-state drive, SSD), or may be a volatile memory (volatile memory) such as a random-access memory (random-access memory, RAM). The memory is any other medium that can carry or store expected program code in a form of instructions or a data structure and that can be accessed by a computer. However, the memory is not limited thereto. The memory in the embodiments of this application may alternatively be a circuit or any other apparatus that can implement a storage function, and is configured to store program instructions and/or data.

All or some of the foregoing methods in the embodiments of this application may be implemented by using software, hardware, firmware, or any combination thereof. When software is used to implement the embodiments, the embodiments may be implemented all or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, a network device, a user device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, an SSD), or the like.

Obviously, a person skilled in the art can make various modifications and variations to this application without departing from the scope of this application. This application is intended to cover these modifications and variations of this application provided that they fall within the scope of protection defined by the following claims and their equivalent technologies.

The invention claimed is:

1. A method comprising:
   establishing dual connections to a master base station and a secondary base station;
   obtaining first link quality information of a serving cell in a secondary cell group (SCG);
   obtaining second link quality information of a neighboring cell of the serving cell when the first link quality information meets a first preset condition;
   generating a first message when the second link quality information does not meet a second preset condition, wherein the first message carries third link quality information that is based on the first link quality information;
   sending the first message to the master base station to enable the master base station to process a service on the SCG based on the first message;
   generating a second message when the second link quality information meets the second preset condition, wherein the second message carries fourth link quality information that is based on the second link quality information; and
   sending the second message to the master base station.

2. The method of claim 1, wherein the first link quality information comprises one or more:
   a quantity of starting times of a timer T313 corresponding to a cell in the SCG;
   a running duration of a timer T313 corresponding to a cell in the SCG;
   a quantity of out-of-synchronization (out of sync) events in a cell in the SCG;
   a throughput of data transmitted in a cell in the SCG;
   a ratio of the throughput to a power consumption amount;
   a quantity of beam failures triggered in a cell in the SCG;
   an amount of data buffered at a radio link control (RLC) layer corresponding to a cell in the SCG;
   a latency of uplink data sent on a link in a cell in the SCG;
   a signal strength of a cell in the SCG;
   a signal strength change amplitude of a cell in the SCG;
   a retransmission rate of data transmitted on a link in a cell in the SCG;
   a signal-to-interference-plus-noise ratio (SINR) of a cell in the SCG;
   a modulation and coding scheme (MCS) index corresponding to a cell in the SCG; or
   a block error rate (BLER) in sending downlink data or receiving uplink data in a cell in the SCG.

3. The method of claim 1, wherein the second link quality information comprises at least one of a reference signal received power (RSRP), a reference signal received quality (RSRQ), a signal to interference plus noise ratio (SINR), a load, a priority, or availability.

4. The method of claim 1, wherein the second message comprises an A3 measurement report, an A4 measurement report, or an A5 measurement report.

5. The method of claim 1, wherein after sending the second message to the master base station, the method further comprises receiving a handover message instructing the terminal device to perform a handover from the serving cell to the neighboring cell.

6. The method of claim 1, wherein the first message comprises an A2 measurement report.

7. The method of claim 1, wherein after sending the first message to the master base station, the method further comprises:
   receiving, from the master base station, a release message instructing the terminal device to release the SCG; and
   releasing the SCG based on the release message.

8. A terminal device comprising:
   a memory configured to store one or more computer programs; and
   one or more processors coupled to the memory and configured to execute the one or more computer programs to cause the terminal device to:
      establish dual connections to a master base station and a secondary base station;
      obtain first link quality information of a serving cell in a secondary cell group (SCG);
      obtain second link quality information of a neighboring cell of the serving cell when the first link quality information meets a first preset condition;
      generate a first message when the second link quality information does not meet a second preset condition, wherein the first message carries third link quality information that is based on the first link quality information;
      send the first message to the master base station to enable the master base station to process a service on the SCG based on the first message;
      generate a second message when the second link quality information meets the second preset condition, wherein the second message carries fourth link quality information that is based on the second link quality information; and
      send the second message to the master base station.

9. The terminal device of claim 8, wherein the first link quality information comprises one or more of:
   a quantity of starting times of a timer T313 corresponding to a cell in the SCG;
   a running duration of a timer T313 corresponding to a cell in the SCG;

a quantity of out-of-synchronization (out of sync) events in a cell in the SCG;
a throughput of data transmitted in a cell in the SCG;
a ratio of a throughput of data transmitted in a cell in the SCG to a power consumption amount;
a quantity of beam failures triggered in a cell in the SCG;
an amount of data buffered at a radio link control (RLC) layer corresponding to a cell in the SCG;
a latency of uplink data sent on a link in a cell in the SCG;
a signal strength of a cell in the SCG;
a signal strength change amplitude of a cell in the SCG;
a retransmission rate of data transmitted on a link in a cell in the SCG;
a signal to interference plus noise ratio (SINR) of a cell in the SCG;
a modulation and coding scheme (MCS) index corresponding to a cell in the SCG; or
a block error rate (BLER) in sending downlink data or receiving uplink data in a cell in the SCG.

10. The terminal device of claim 8, wherein the second link quality information comprises at least one of a reference signal received power (RSRP), a reference signal received quality (RSRQ), a signal to interference plus noise ratio (SINR), a load, a priority, or availability.

11. The terminal device of claim 8, wherein the second message comprises an A3 measurement report, an A4 measurement report, or an A5 measurement report.

12. The terminal device of claim 8, wherein after sending the second message to the master base station, the one or more processors is further configured to execute the one or more computer programs to cause the terminal device to receive, from the master base station, a handover message instructing the terminal device to perform a handover from the serving cell to the neighboring cell.

13. The terminal device of claim 8, wherein the first message comprises an A2 measurement report.

14. The terminal device of claim 8, wherein the one or more processors is further configured to execute the one or more computer programs to cause the terminal device to:
receive a release message instructing the terminal device to release the SCG; and
release the SCG based on the release message.

15. A computer program product comprising computer-executable instructions stored on a non-transitory computer-readable medium and that, when executed by one or more processors, cause a terminal device to:
establish dual connections to a master base station and a secondary base station;
obtain first link quality information of a serving cell in a secondary cell group (SCG);
obtain second link quality information of a neighboring cell of the serving cell when the first link quality information meets a first preset condition;
generate a first message when the second link quality information does not meet a second preset condition, wherein the first message carries third link quality information that is based on the first link quality information;
send the first message to the master base station to enable the master base station to process a service on the SCG based on the first message;
generate a second message when the second link quality information meets the second preset condition, wherein the second message carries fourth link quality information that is based on the second link quality information; and
send the second message to the master base station.

16. The computer program product of claim 15, wherein the first link quality information comprises one or more of:
a quantity of starting times of a timer T313 corresponding to a cell in the SCG;
a running duration of a timer T313 corresponding to a cell in the SCG;
a quantity of out-of-synchronization (out of sync) events in a cell in the SCG;
a throughput of data transmitted in a cell in the SCG;
a ratio of a throughput of data transmitted in a cell in the SCG to a power consumption amount;
a quantity of beam failures triggered in a cell in the SCG;
an amount of data buffered at a radio link control (RLC) layer corresponding to a cell in the SCG;
a latency of uplink data sent on a link in a cell in the SCG;
a signal strength of a cell in the SCG;
a signal strength change amplitude of a cell in the SCG;
a retransmission rate of data transmitted on a link in a cell in the SCG;
a signal to interference plus noise ratio (SINR) of a cell in the SCG;
a modulation and coding scheme (MCS) index corresponding to a cell in the SCG; or
a block error rate (BLER) in sending downlink data or receiving uplink data in a cell in the SCG.

17. The computer program product of claim 15, wherein the second link quality information comprises at least one of a reference signal received power (RSRP), a reference signal received quality (RSRQ), a signal to interference plus noise ratio (SINR), a load, a priority, or availability.

18. The computer program product of claim 15, wherein the second message comprises an A3 measurement report, an A4 measurement report, or an A5 measurement report.

19. The computer program product of claim 15, wherein after sending the second message to the master base station, the method further comprises receiving a handover message instructing the terminal device to perform a handover from the serving cell to the neighboring cell.

20. The computer program product of claim 15, wherein the first message comprises an A2 measurement report.

* * * * *